US011897721B2

(12) United States Patent
Fukui et al.

(10) Patent No.: US 11,897,721 B2
(45) Date of Patent: Feb. 13, 2024

(54) PRINTING APPARATUS

(71) Applicant: CANON KABUSHIKI KAISHA, Tokyo (JP)

(72) Inventors: Kohei Fukui, Tokyo (JP); Tomoyuki Nagase, Kanagawa (JP); Waichiro Saiki, Kanagawa (JP); Tomohiro Suzuki, Kanagawa (JP); Ryo Kobayashi, Kanagawa (JP); Takeshi Koda, Kanagawa (JP); Toshiro Sugiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 17/528,433

(22) Filed: Nov. 17, 2021

(65) Prior Publication Data

US 2022/0169477 A1 Jun. 2, 2022

(30) Foreign Application Priority Data

Nov. 27, 2020 (JP) ................................ 2020-197310

(51) Int. Cl.
*B65H 5/26* (2006.01)
*B65H 20/02* (2006.01)
(Continued)

(52) U.S. Cl.
CPC ................ *B65H 5/26* (2013.01); *B41J 11/42* (2013.01); *B41J 11/70* (2013.01); *B41J 13/0009* (2013.01);
(Continued)

(58) Field of Classification Search
CPC ...... B65H 2404/144; B65H 2404/1441; B65H 2404/1442; B65H 2511/11;
(Continued)

(56) References Cited

U.S. PATENT DOCUMENTS 3,645,157 A 2/1972 Di Giulio et al.
4,265,153 A 5/1981 Price, Jr.
(Continued)

FOREIGN PATENT DOCUMENTS

CN 104626767 A 5/2015
CN 104669807 A 6/2015
(Continued)

OTHER PUBLICATIONS

U.S. Appl. No. 17/528,412, Shinya Asano Takeshi Koda Toshiro Sugiama Waichiro Saiki Tomohiro Suzuki Ryo Kobayashi Tomoyuki Nagase, filed Nov. 17, 2021.
(Continued)

*Primary Examiner* — Jeremy R Severson
(74) *Attorney, Agent, or Firm* — Venable LLP

(57) ABSTRACT

A printing apparatus includes a printing unit; a first conveyance unit configured to convey a sheet to the printing unit while nipping the sheet; a second conveyance unit provided on a downstream side of the first conveyance unit in a conveyance direction of the sheet, and configured to convey the sheet while nipping the sheet; a third conveyance unit provided on a downstream side of the second conveyance unit in the conveyance direction, and configured to convey the sheet while nipping the sheet; and a switching unit configured to switch between a nip state of the second conveyance unit and a released state in which the nip state is released. When the sheet is conveyed by the third conveyance unit, the switching unit switches between the nip state and the released state in accordance with a length of the sheet.

21 Claims, 19 Drawing Sheets

(51) Int. Cl.

| | |
|---|---|
| ***B65H 29/60*** | (2006.01) |
| ***B65H 35/00*** | (2006.01) |
| ***B65H 29/12*** | (2006.01) |
| ***B65H 35/04*** | (2006.01) |
| ***B41J 11/42*** | (2006.01) |
| ***B41J 11/70*** | (2006.01) |
| ***B41J 13/02*** | (2006.01) |
| ***B41J 15/04*** | (2006.01) |
| ***B65H 5/06*** | (2006.01) |
| ***B65H 7/02*** | (2006.01) |
| ***B41J 13/00*** | (2006.01) |
| *B41J 11/00* | (2006.01) |

(52) U.S. Cl.
CPC ............. *B41J 13/02* (2013.01); *B41J 15/042* (2013.01); *B41J 15/046* (2013.01); *B65H 5/062* (2013.01); *B65H 7/02* (2013.01); *B65H 20/02* (2013.01); *B65H 29/125* (2013.01); *B65H 29/60* (2013.01); *B65H 35/008* (2013.01); *B65H 35/04* (2013.01); *B41J 11/0095* (2013.01); *B65H 2404/1441* (2013.01); *B65H 2404/632* (2013.01); *B65H 2511/11* (2013.01); *B65H 2511/22* (2013.01); *B65H 2513/40* (2013.01); *B65H 2513/50* (2013.01); *B65H 2801/21* (2013.01)

(58) Field of Classification Search
CPC .. B65H 2511/114; B65H 20/02; B65H 29/60; B65H 35/008; B65H 2404/632; B65H 2801/21; B41J 11/0095
See application file for complete search history.

(56) References Cited

U.S. PATENT DOCUMENTS

| | | | | |
|---|---|---|---|---|
| 6,845,228 | B2 | 1/2005 | Suzuki et al. | |
| 7,354,034 | B2 | 4/2008 | Nakamura et al. | |
| 7,540,496 | B2 * | 6/2009 | Fukushima | B65H 9/002 271/253 |
| 8,056,899 | B2 * | 11/2011 | Byun | B65H 29/58 271/303 |
| 9,174,463 | B2 | 11/2015 | Shingawa et al. | |
| 9,327,525 | B2 | 5/2016 | Motoyama | |
| 9,592,683 | B2 | 3/2017 | Kobayashi et al. | |
| 9,884,697 | B2 | 2/2018 | Hirose | |
| 9,969,192 | B2 | 5/2018 | Suzuki et al. | |
| 10,787,009 | B2 | 9/2020 | Kozuma et al. | |
| 10,829,329 | B2 | 11/2020 | Suzuki et al. | |
| 2005/0206074 | A1 | 9/2005 | Tsuzawa | |
| 2006/0022399 | A1 | 2/2006 | Fukushima | |
| 2017/0151815 | A1 | 6/2017 | Masunaga | |
| 2018/0093505 | A1 | 4/2018 | Hirata et al. | |
| 2018/0257403 | A1 | 9/2018 | Yasuda et al. | |
| 2020/0039255 | A1 | 2/2020 | Kozuma et al. | |
| 2021/0237998 | A1 | 8/2021 | Kobayashi | |
| 2021/0276348 | A1 | 9/2021 | Suto et al. | |
| 2021/0276349 | A1 | 9/2021 | Kuronuma et al. | |
| 2021/0276350 | A1 | 9/2021 | Murata et al. | |

FOREIGN PATENT DOCUMENTS

| | | | |
|---|---|---|---|
| CN | 106687296 | A | 5/2017 |
| CN | 110789229 | A | 2/2020 |
| JP | 2005-263332 | A | 9/2005 |
| JP | 2005-298212 | A | 10/2005 |
| JP | 2012-046283 | A | 3/2012 |

OTHER PUBLICATIONS

Extended European Search Report dated Apr. 4, 2022, in European Patent Application No. 21207230.0.
Chinese Office Action dated May 26, 2023, in Chinese Patent Application No. 202111412843.9.

* cited by examiner

PRINTING APPARATUS

BACKGROUND OF THE INVENTION

Field of the Invention

The present invention relates to a printing apparatus.

Description of the Related Art

A large format inkjet printer may perform printing on sheets of different sheet lengths. For example, in a printer that performs printing on a roll sheet, it is possible to change the sheet length of a discharged sheet by changing the cutting position of the roll sheet. Further, there has been proposed a printer including a plurality of discharge paths having different path lengths, in which the discharge path can be selectively switched (for example, Japanese Patent Laid-Open No. 2005-263332). In this printer, in accordance with switching of the discharge path, separation between a pair of rollers which nip and convey a sheet is switched.

Accordingly, if the discharge path is not switched, the number of pairs of rollers which simultaneously nip the sheet changes depending on the sheet length. This causes scratches on the sheet or a decrease in conveyance accuracy. Thus, when conveying sheets of different sheet lengths, various problems occur. Therefore, it is necessary to appropriately configure the pair of rollers, the separation mechanism for the pair of rollers, the switching mechanism for the discharge paths, and the conveyance mechanism including the conveyance path in accordance with the problems.

SUMMARY OF THE INVENTION

The present invention provides a printing apparatus that can appropriately convey sheets of different sheet lengths.

According to an aspect of the present invention, there is provided a printing apparatus comprising: a printing unit configured to perform printing on a sheet; a first conveyance unit configured to convey the sheet to the printing unit with nipping the sheet; a second conveyance unit provided on a downstream side of the first conveyance unit in a conveyance direction of the sheet, and configured to convey the sheet with nipping the sheet; a third conveyance unit provided on a downstream side of the second conveyance unit in the conveyance direction, and configured to convey the sheet with nipping the sheet; and a switching unit configured to switch a nip state of the second conveyance unit and a released state in which the nip state is released, wherein if the sheet is conveyed by the third conveyance unit, the switching unit switches the nip state and the released state in accordance with a length of the sheet.

Further features of the present invention will become apparent from the following description of exemplary embodiments (with reference to the attached drawings).

DESCRIPTION OF THE EMBODIMENTS

Figure 1:
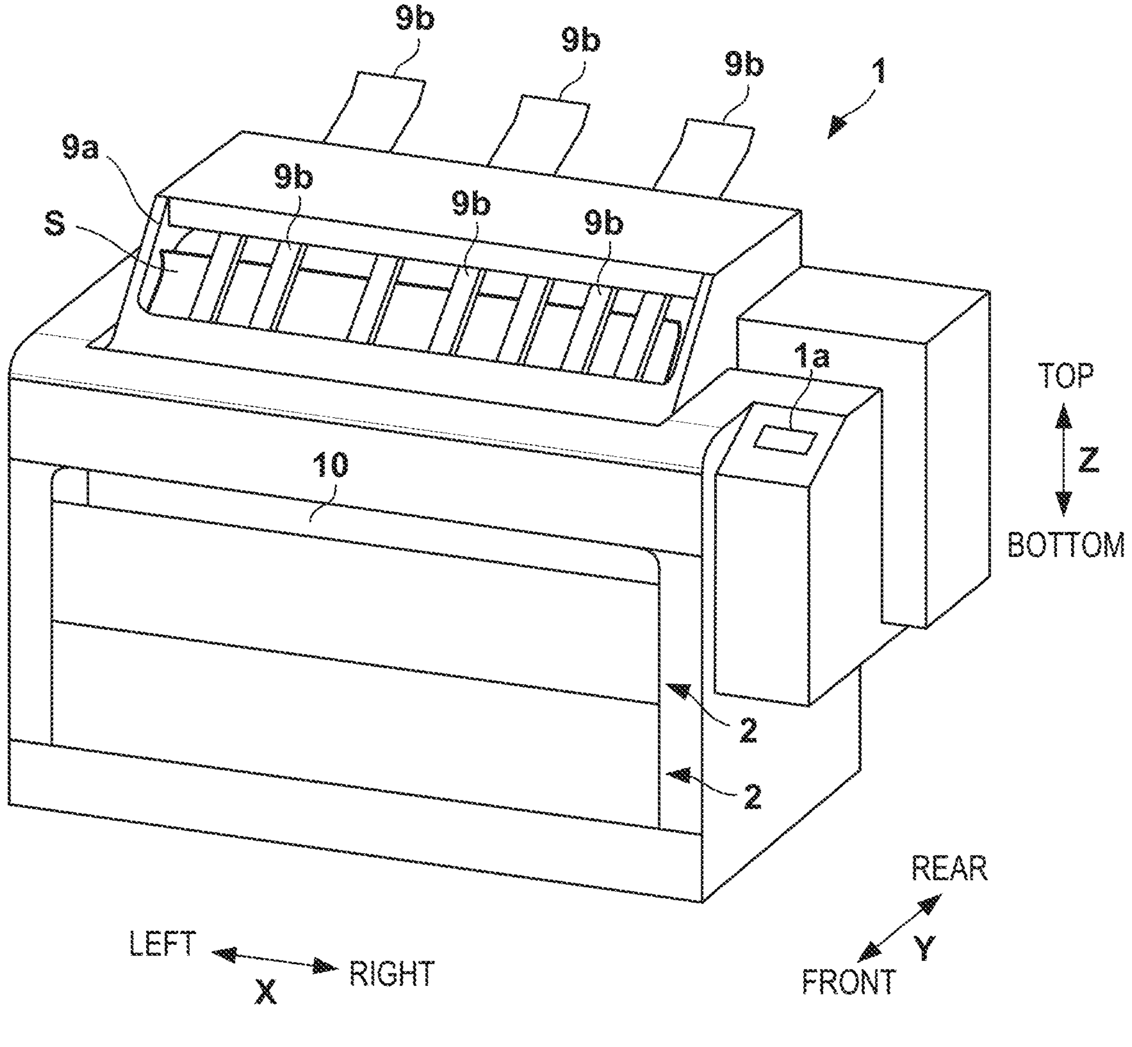
FIG. 1 is an external perspective view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Outline of Printing Apparatus>

Figure 2:
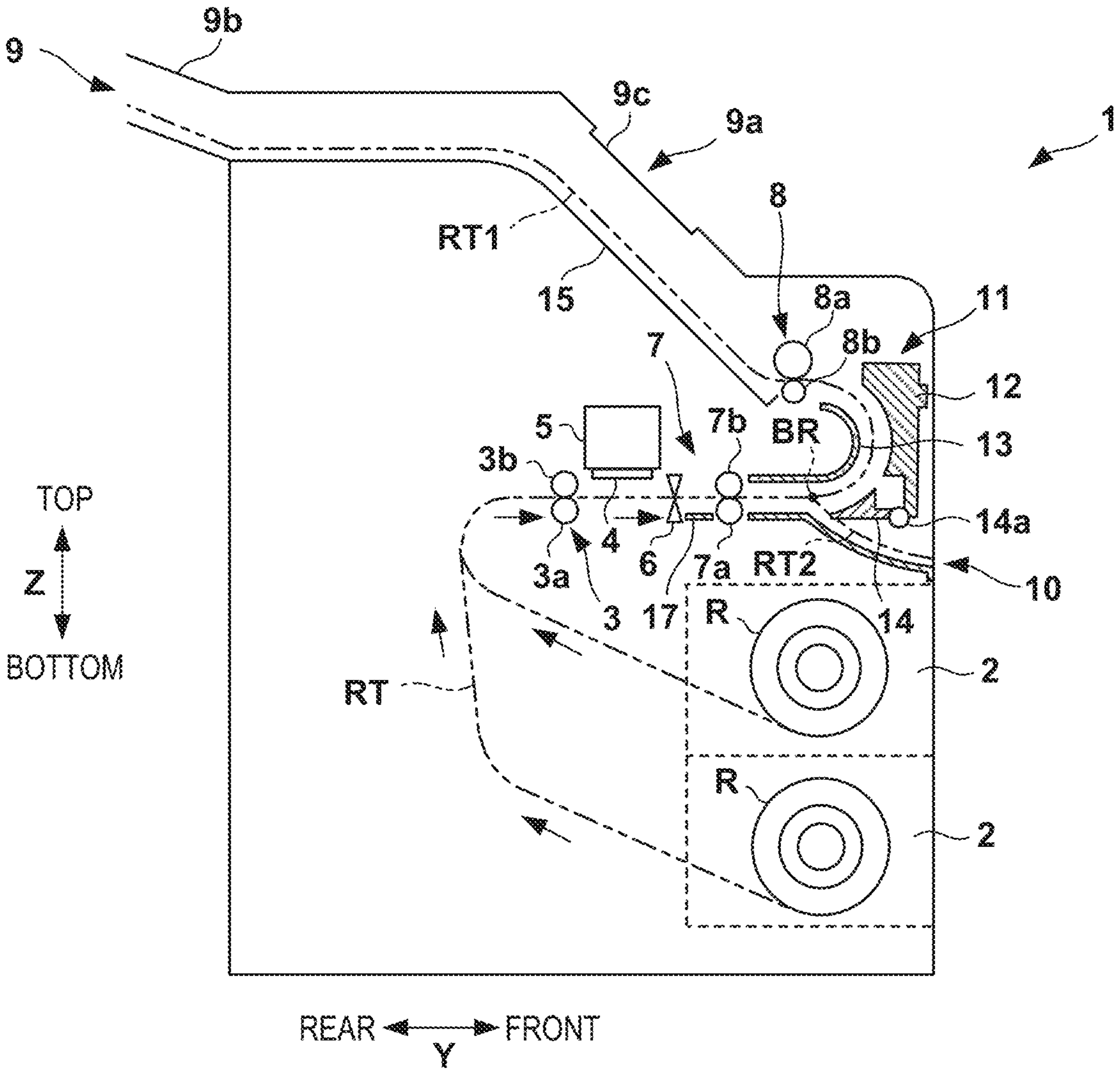
FIG. 2 is a schematic view showing the internal structure of the printing apparatus shown in FIG. 1.

FIG. 1 is an external perspective view of a printing apparatus 1 according to an embodiment of the present invention, and FIG. 2 is a schematic view showing the internal structure of the printing apparatus 1. An arrow X indicates the widthwise direction (left-and-right direction) of the printing apparatus 1, an arrow Y indicates the depth direction (front-and-rear direction) of the printing apparatus 1, and an arrow Z indicates the vertical direction. Note that “printing” includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a “print medium” serving as a print target, sheet-like cloth, a plastic film, and the like may be used as print media.

An operation panel 1*a* for accepting user’s instruction is provided in the front portion of the printing apparatus 1. A user can use various kinds of switches and the like provided in the operation panel 1*a* to input various kinds of commands such as a designation of the sheet size and setting of the discharge destination of a printed sheet.

In the lower portion of the printing apparatus 1, a plurality of feeding units 2 are vertically arranged in a plurality of stages (two stages in this example). Each feeding unit 2 forms a storage section that stores a roll sheet R as a print medium. Each feeding unit 2 includes support portions that support the roll sheet R so as to be rotatable around the X-direction axis, and also includes a feeding mechanism that pulls out a sheet from the roll sheet R and feeds it to a conveyance path RT. In this embodiment, the widthwise direction of the sheet is the X direction. The user can perform a replacement operation of the roll sheet R from the front of the printing apparatus 1. Note that in this embodiment, the roll sheet R is exemplified as the print medium, but the print medium may be a cut sheet.

The conveyance path RT is a sheet path defined by a guide structure which guides a sheet, and extends from the feeding unit 2 to a discharge port 9 or a discharge port 10 while curving in the midway. In the following description, an upstream side and a downstream side are the upstream side and the downstream side with respect to the sheet conveyance direction, respectively.

The sheet pulled out from the roll sheet R is supplied via a conveyance unit 3 to a position facing a printhead 4. The conveyance unit 3 includes a conveying roller 3*a*, which is a driving rotating body, and a nip roller 3*b*, which is a driven rotating body pressed against the conveying roller 3*a*. While being nipped by the conveying roller 3*a* and the nip roller 3*b*, the sheet is conveyed on the conveyance path RT in the arrow direction by rotation of the rollers.

The printhead 4 is arranged on the downstream side of the conveyance unit 3. The printhead 4 in this embodiment is an inkjet head which prints an image on a sheet by discharging ink. The printhead 4 uses a discharge energy generating device such as an electrothermal transducer (heater) or a piezoelectric device to discharge ink from the discharge port. The printing apparatus 1 according to this embodiment is a serial scanning inkjet printing apparatus, and the printhead 4 is mounted on a carriage 5. The carriage 5 is configured to be reciprocated in the X direction (the widthwise direction of the sheet) by a driving mechanism (not shown). In the vicinity of the printhead 4, the sheet is conveyed in the Y direction. By alternately repeating intermittent conveyance of the sheet by the conveyance unit 3 and an operation including moving the carriage 5 and ink discharge by the printhead 4, an image is printed on the sheet.

Note that the serial scanning printing apparatus is exemplarily shown in this embodiment, but the present invention is also applicable to a full-line printing apparatus. In this case, a long printhead extending in the widthwise direction of a sheet is used as the printhead 4. Then, by discharging ink from the printhead while continuously conveying the sheet, an image is printed on the sheet. Further, although the inkjet printing apparatus is exemplarily shown in this embodiment, the present invention is also applicable to printing apparatuses of other printing types.

A cutting unit 6 is arranged on the downstream side of the printhead 4. The cutting unit 6 cuts the sheet, which has been pulled out from the roll sheet R and has an image printed thereon, in the widthwise direction of the sheet. With this, the sheet pulled out from the roll sheet R is cut by the cutting unit 6 and becomes a cut sheet. A sheet guide structure adjacent to the cutting unit 6 includes a movable support member 17. The movable support member 17 is one of guide members which forms the conveyance path RT while supporting the sheet from below. The movable support member 17 is configured to be moved at the time of a cutting operation of the cutting unit 6. The details will be described later.

A discharge unit 7 is arranged on the downstream side of the cutting unit 6. The discharge unit 7 is one of conveyance units for conveying the sheet. The discharge unit 7 is a unit for discharging the sheet having undergone printing. The discharge unit 7 includes a discharge roller 7*a*, which is a driving rotating body, and a nip roller 7*b*, which is a driven rotating body pressed against the discharge roller 7*a*. While being nipped by the discharge roller 7*a* and the nip roller 7*b*, the sheet is conveyed on the conveyance path RT in the arrow direction by rotation of the rollers. In this embodiment, the discharge unit 7 is configured to be switchable between a nip state (a nip state between the rollers) for nipping the sheet and a nip released state (a nip released state between the rollers). The details will be described later.

The conveyance path RT branches at a branch point BR on the downstream side of the discharge unit 7, and includes a plurality of discharge paths including a discharge path RT1 and a discharge path RT2. The discharge path RT1 is a sheet discharge path extending from the branch point BR to the discharge port 9, and a path for discharging the sheet to the rear side in the Y direction. The discharge path RT2 is a sheet discharge path extending from the branch point BR to the discharge port 10, and a path for discharging the sheet to the front side in the Y direction. In this embodiment, the path length of the discharge path RT1 is longer than that of the discharge path RT2, and the discharge path RT1 extends in the Y direction in the upper portion of the printing apparatus 1.

The branch point BR is a path switching position where a path switching member 14 is arranged. The path switching member 14 includes a shaft 14*a* extending in the X direction, and is provided so as to be pivotable with the shaft 14*a* as the pivot center. The path switching member 14 switches, between the plurality of discharge paths RT1 and RT2, the discharge path used to discharge a sheet having undergone printing by the printhead 4. Switching of the discharge paths is performed in accordance with, for example, user's selection instruction. The position of the path switching member 14 shown in FIG. 2 is the position for selecting the discharge path RT1.

The discharge port 9 is located in the rear portion of the printing apparatus 1, and open in the back face of the printing apparatus 1. A plurality of guides 9*b* that restrict a warp of the sheet is provided in the upper portion of the discharge port 9. The discharge path RT1 passes above the shaft 14*a*, and a reversing section 11, a discharge unit 8, and a stacking section 15 are provided midway along the discharge path RT1 from the upstream side toward the downstream side.

The reversing section 11 is a structure for reversing the sheet having undergone printing. In this embodiment, by forming, midway along the discharge path RT1, a curved portion (in this embodiment, a U shape (an inverted C shape in the side view shown in FIG. 2)) where the shape of the path is curved, the sheet is reversed. At the time of having passed through the printhead 4, the upper surface of the sheet is the image printed surface, but the image printed surface of the sheet becomes the lower surface after passing through the reversing section 11. The reversing section 11 includes a guide member 12, which forms a U-shaped outer path forming wall (guide surface), and a guide member 13, which forms the inner path forming wall (guide surface), and the path is formed between the guide members 12 and 13.

The discharge unit 8 is one of the conveyance units for conveying the sheet. The discharge unit 8 is a unit for discharging the sheet having undergone printing. The discharge unit 8 includes a discharge roller 8*a*, which is a driving rotating body, and a nip roller 8*b*, which is a driven rotating body pressed against the discharge roller 8*a*. While being nipped by the discharge roller 8*a* and the nip roller 8*b*, the sheet is conveyed by rotation of the rollers. The stacking section 15 is arranged on the downstream side of the discharge unit 8, and the discharge unit 8 conveys, to the stacking section 15, the sheet with the image printed thereon by the printhead 4. In this embodiment, the discharge unit 8 cannot be switched between a nip state and a nip released state like the discharge unit 7, and it is always in the nip state.

The stacking section 15 forms a tray which receives a plurality of sheets discharged from the discharge unit 7, and the stacking section 15 is arranged inside the printing apparatus 1. The stacking section 15 forms the discharge path RT1 which is almost horizontal in the rear portion in the Y direction and slopes upward toward the rear portion in the front portion in the Y direction. Depending on the length of the sheet, the end portion of the sheet may come out of the discharge port 9. The stacking section 15 forms a part of the discharge path RT1.

A window portion 9*a* for exposing the stacking section 15 is formed in the top portion of the printing apparatus 1, so that the user can visually recognize the stacking amount of sheets on the stacking section 15 via the window portion 9*a*. A plurality of guide members 9*c* are disposed in the window portion 9*a* to prevent the sheet discharged onto the stacking section 15 from being discharged from the window portion 9*a*.

The discharge port 10 is located in the front portion of the printing apparatus 1 and open to the front of the printing apparatus 1. The discharge path RT2 is a path passing below the shaft 14*a*, and does not have a structure for reversing the sheet like the reversing section 11. That is, the image printed surface of the sheet discharged from the discharge port 10 is the upper surface. Further, no sheet conveyance mechanism like the discharge unit 8 is provided midway along the discharge path RT2. Accordingly, the sheet is conveyed by conveyance of the conveyance unit 3, cut by the cutting unit 6, and discharged from the discharge port 10 due to its own weight or by a manual operation of the user.

As has been described above, in this embodiment, it is possible to select whether to discharge the sheet to the stacking section 15 on the upper side or to the front of the printing apparatus 1. For example, if the number of discharged sheets is large, the stacking section 15 may be selected, and if the sheet length is long, discharge from the discharge port 10 may be selected. In this manner, it is possible for the user to arbitrarily select the discharge path.

Figure 3:
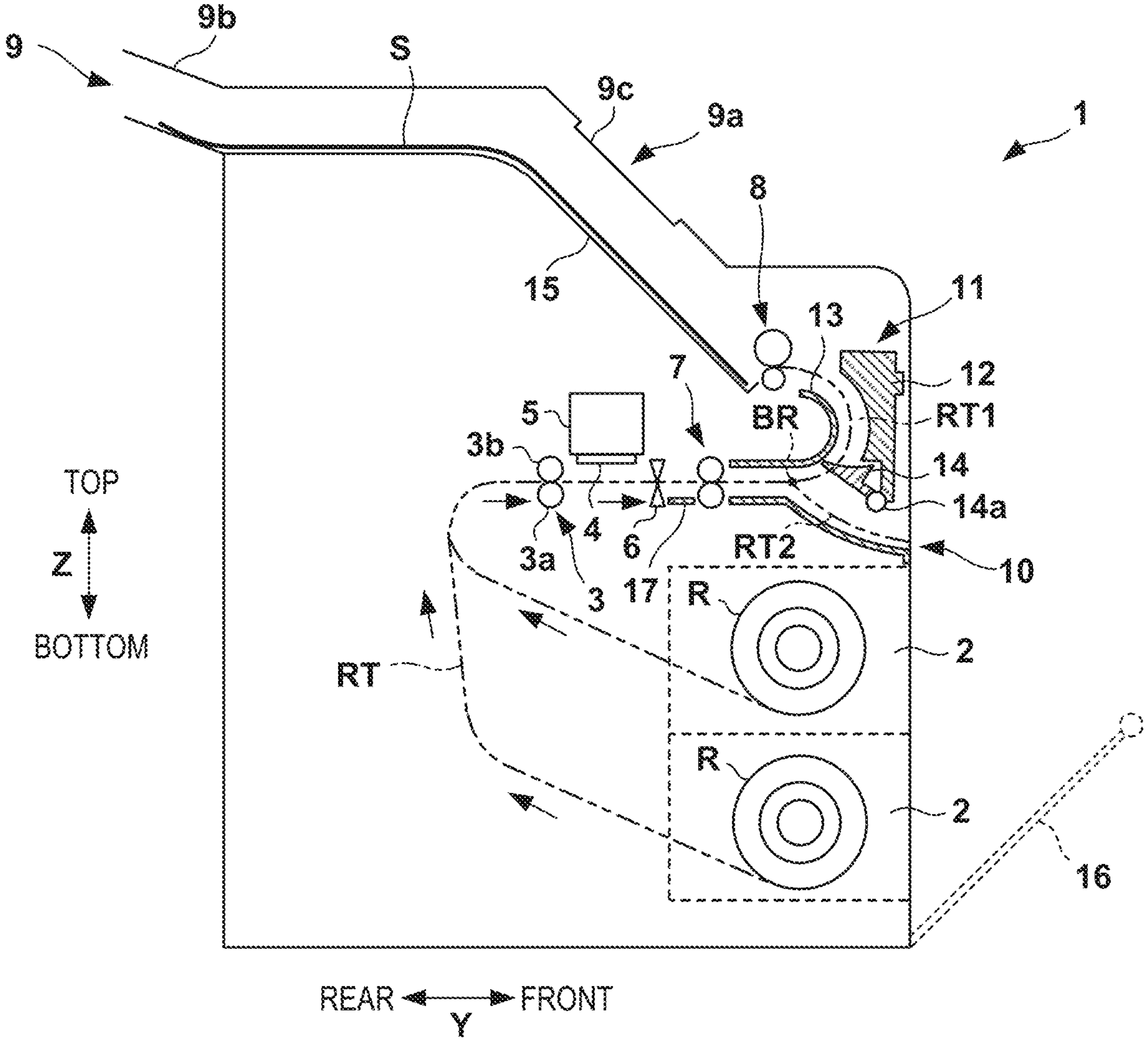
FIG. 3 is a view for explaining an operation of the printing apparatus shown in FIG. 1.
Figure 4:
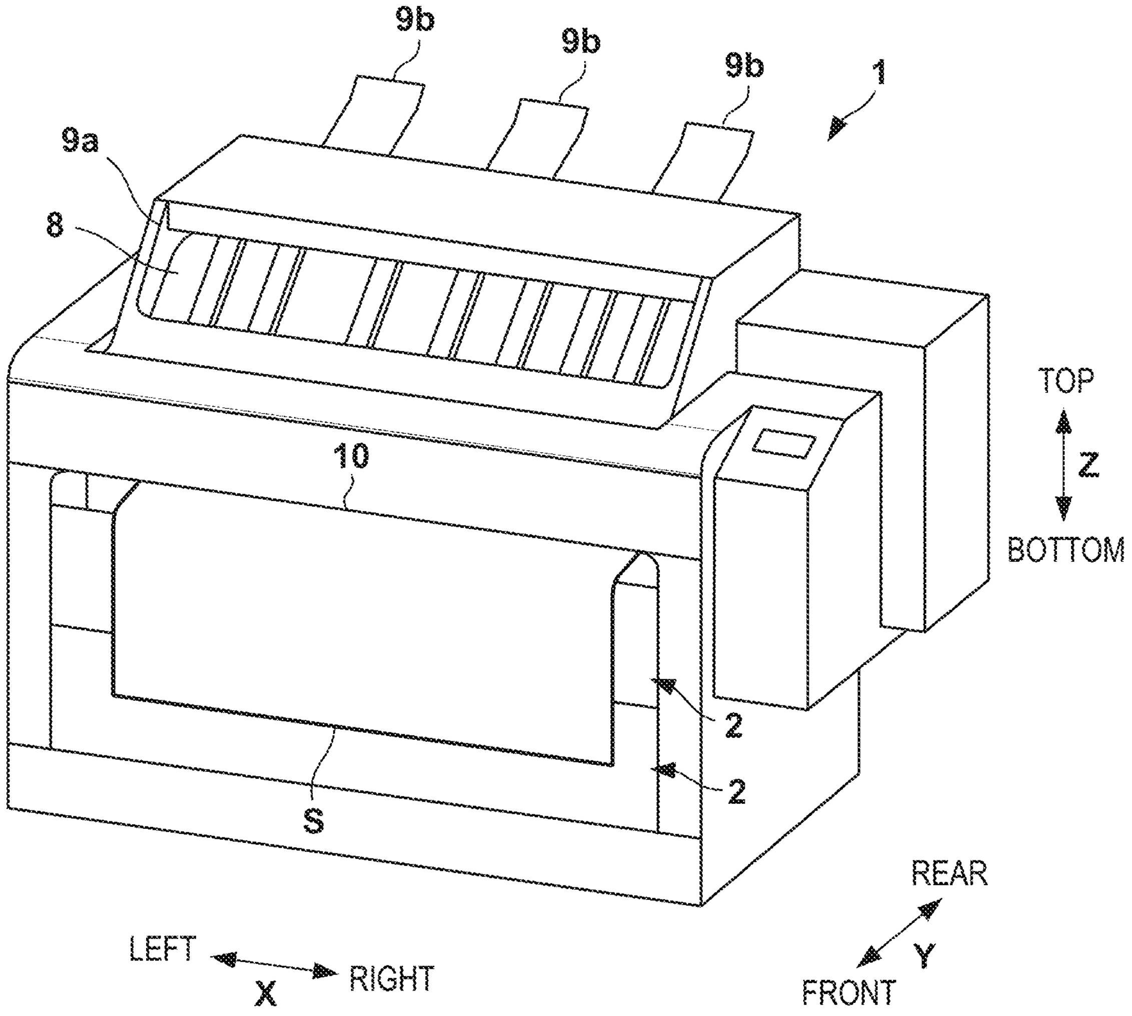
FIG. 4 is a view for explaining an example of the sheet discharge mode in the printing apparatus shown in FIG. 1.

FIG. 3 shows an example of the operation mode of the printing apparatus 1. In the example shown in FIG. 3, a printed sheet S has been discharged onto the stacking section 15. The position of the path switching member 14 in FIG. 3 is the position for selecting the discharge path RT2. If the discharge path RT2 is selected, the printed sheet S is discharged from the discharge port 10 to the front of the printing apparatus 1 in the mode shown in FIG. 4. At this time, the discharged sheet S is collected by a basket 16 as exemplarily shown in FIG. 3. The basket 16 may be a member different from the printing apparatus 1, or may be provided in the lower portion of the printing apparatus 1 so as to be retractable.

Figure 5:
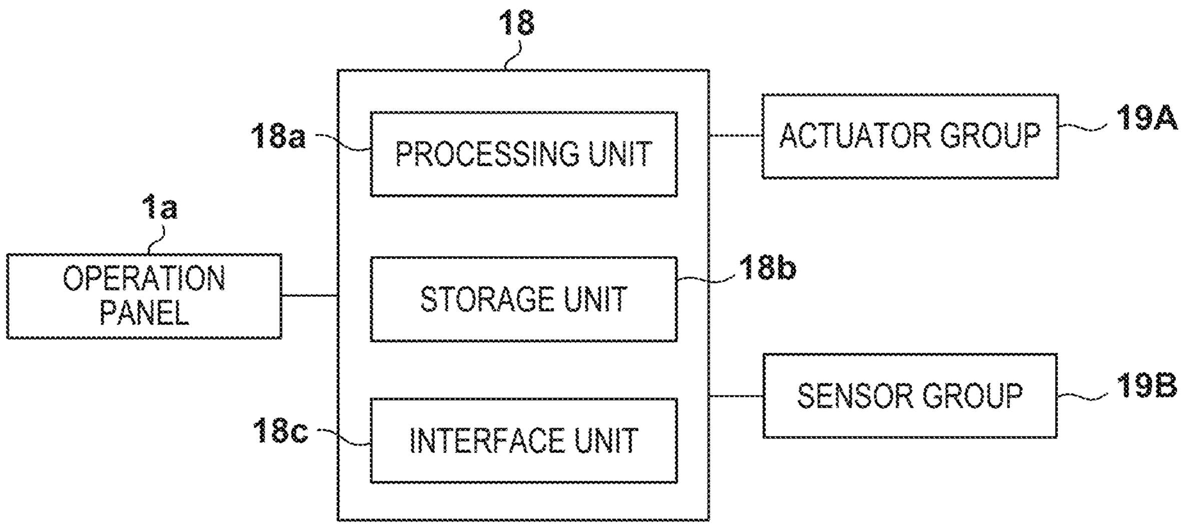
FIG. 5 is a block diagram of a control unit of the printing apparatus shown in FIG. 1.

FIG. 5 is a block diagram of a control unit 18 of the printing apparatus 1. The control unit 18 includes a processing unit 18*a* which is a processor such as a CPU, a storage unit 18*b* which is a storage device such as a ROM or a RAM, and an interface unit 18*c* which relays signals from/to external devices. The processing unit 18*a* executes programs stored in the storage unit 18*b* and, for example, controls an actuator group 19A based on setting information accepted using the operation panel 1*a* or a detection result of a sensor group 19B. As the setting information, the kind and width of the sheet S, selection information of the discharge path, and the like are included. The actuator group 19A includes the driving source (for example, motor) of each of the feeding unit 2 and the conveyance unit 3, motors M1 to M3 to be described later, an electromagnetic clutch provided in a gear 23 to be described later, and the like. The sensor group 19B includes, in addition to sensors 50 and 51 to be described later, a plurality of sheet detection sensors for detecting the leading end position and the trailing end position of the sheet S in the conveyance path RT, and the like.

<Components in Vicinity of Reversing Section>

Figure 6:
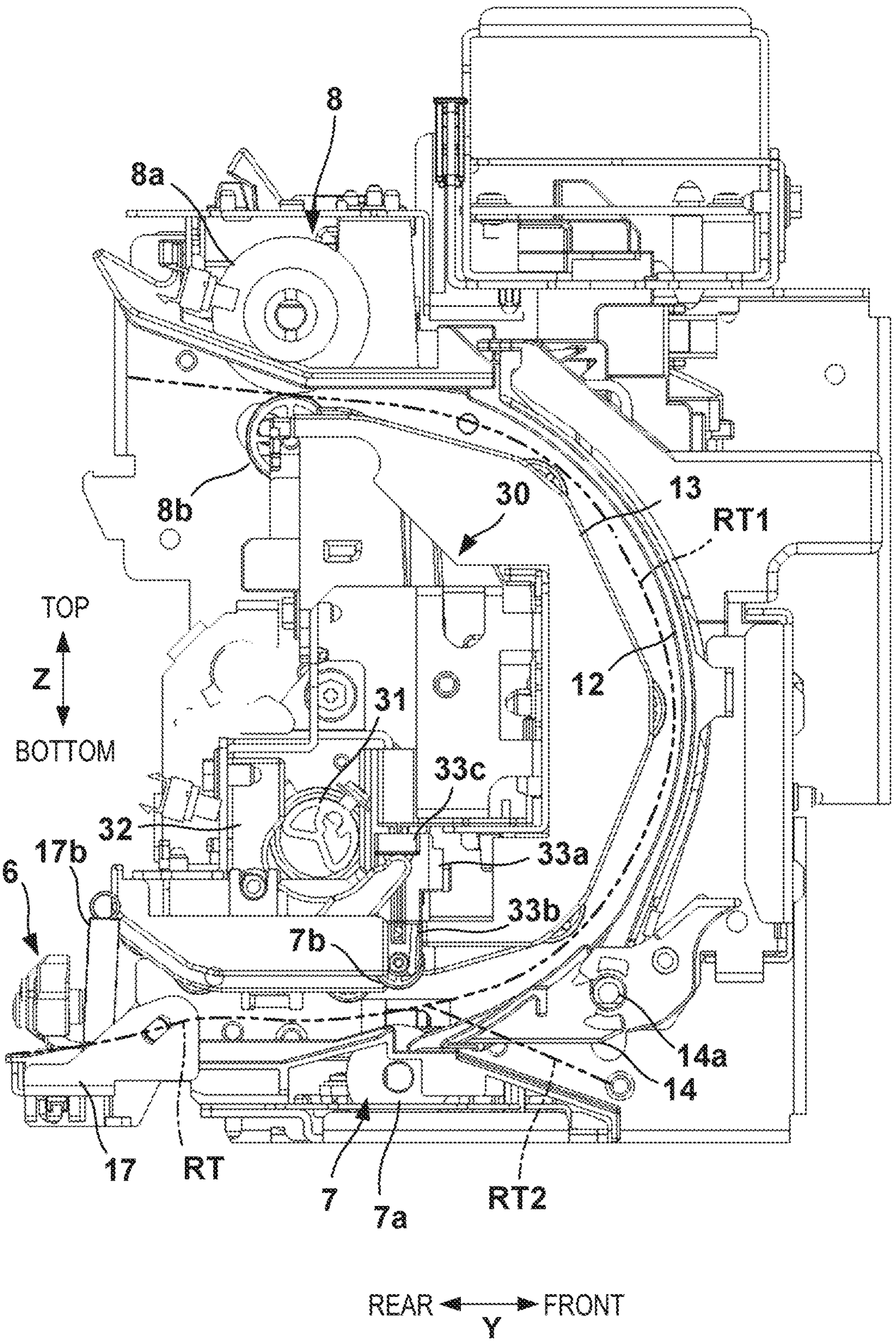
FIG. 6 is a sectional view showing the vicinity of a reversing section.

The components in vicinity of the reversing section 11 and driving systems for driving them will be described. FIG. 6 is a sectional view showing the vicinity of the reversing section 11. From the upstream side on the conveyance path RT, the cutting unit 6, the movable support member 17, the discharge unit 7, the path switching member 14, and the discharge unit 8 are arranged. The discharge unit 8 is arranged at a position higher than the discharge unit 7, and the path (the U-shaped portion of the discharge path RT1) of the reversing section 11 is arranged between the discharge unit 7 and the discharge unit 8. Further, an elevating mechanism 30 which vertically moves the nip roller 7*b* is arranged in a space between the discharge unit 7 and the discharge unit 8 in the Z direction.

In this embodiment, the movable support member 17 and the elevating mechanism 30 are driven by a driving unit (DU1), and the discharge rollers 7*a* and 8*a* and the path switching member 14 are driven by a driving unit (DU2). The arrangement of each driving unit will be described below.

<Driving Unit DU1>

Figure 7:
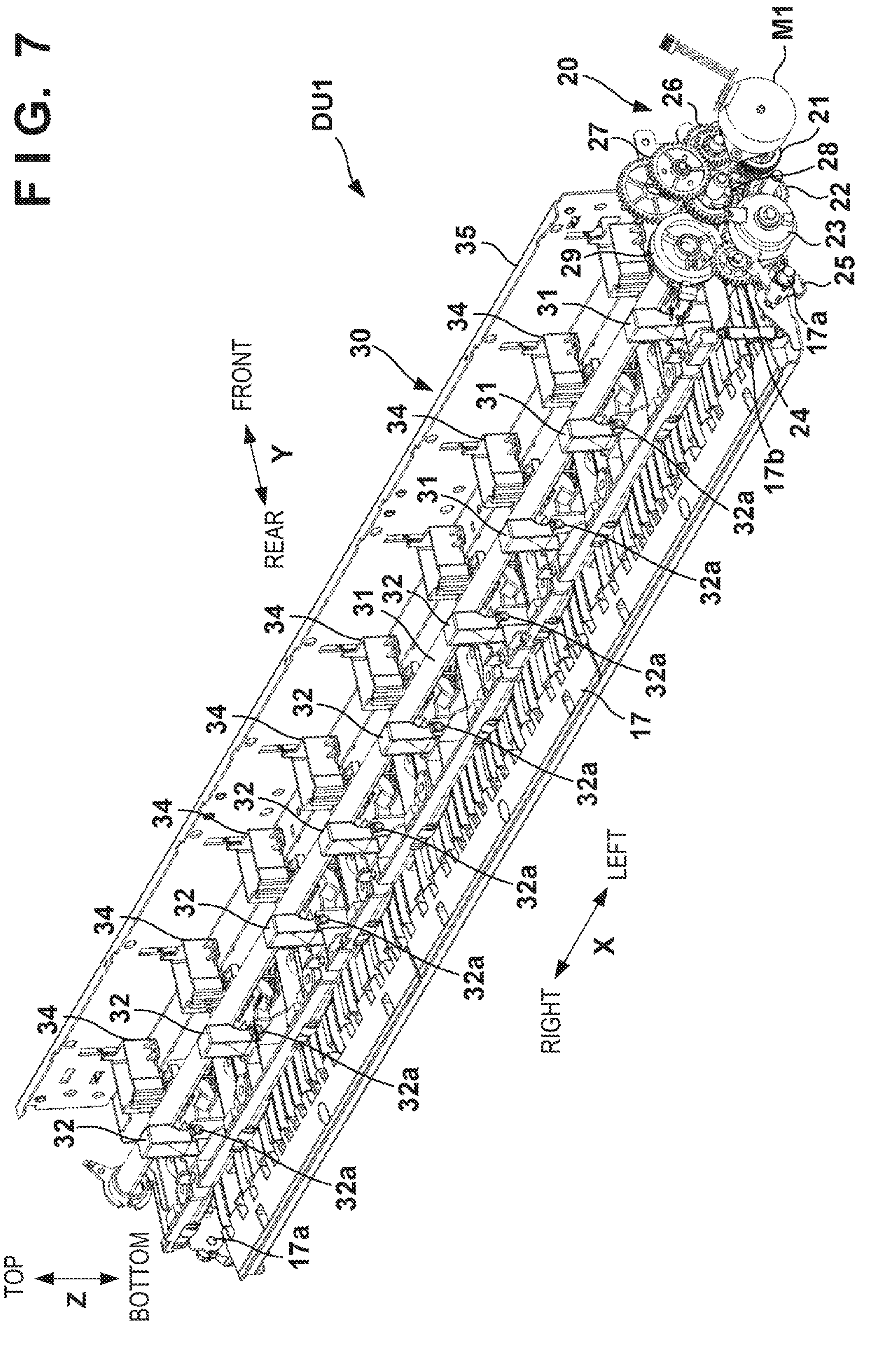
FIG. 7 is a schematic view of a driving unit.

FIG. 7 is a schematic view of the driving unit DU1. The driving unit DU1 forms a moving mechanism that moves the movable support member 17 to a support position for supporting a sheet and a retreat position retreated from the support position. The driving unit DU1 also forms a state switching mechanism that switches the nip state and the nip released state of the discharge unit 7. In order to switch the nip state and the nip released state, the state switching mechanism causes the elevating mechanism 30 to vertically move the nip roller 7*b* between a position where the nip roller 7*b* is pressed against the driving roller 7*a* and a position where the nip roller 7*b* is separated from the driving roller 7*a*. The driving unit DU1 includes the motor M1 as a common driving source. A driving force of the motor M1 is transmitted to each component by a transmission mechanism 20 which forms a transmission path of the driving force. The motor M1 and the transmission mechanism 20 are concentratedly arranged outside (left side) the conveyance path RT in the widthwise direction (X direction) of the sheet.

<Moving Mechanism>

Figure 8:
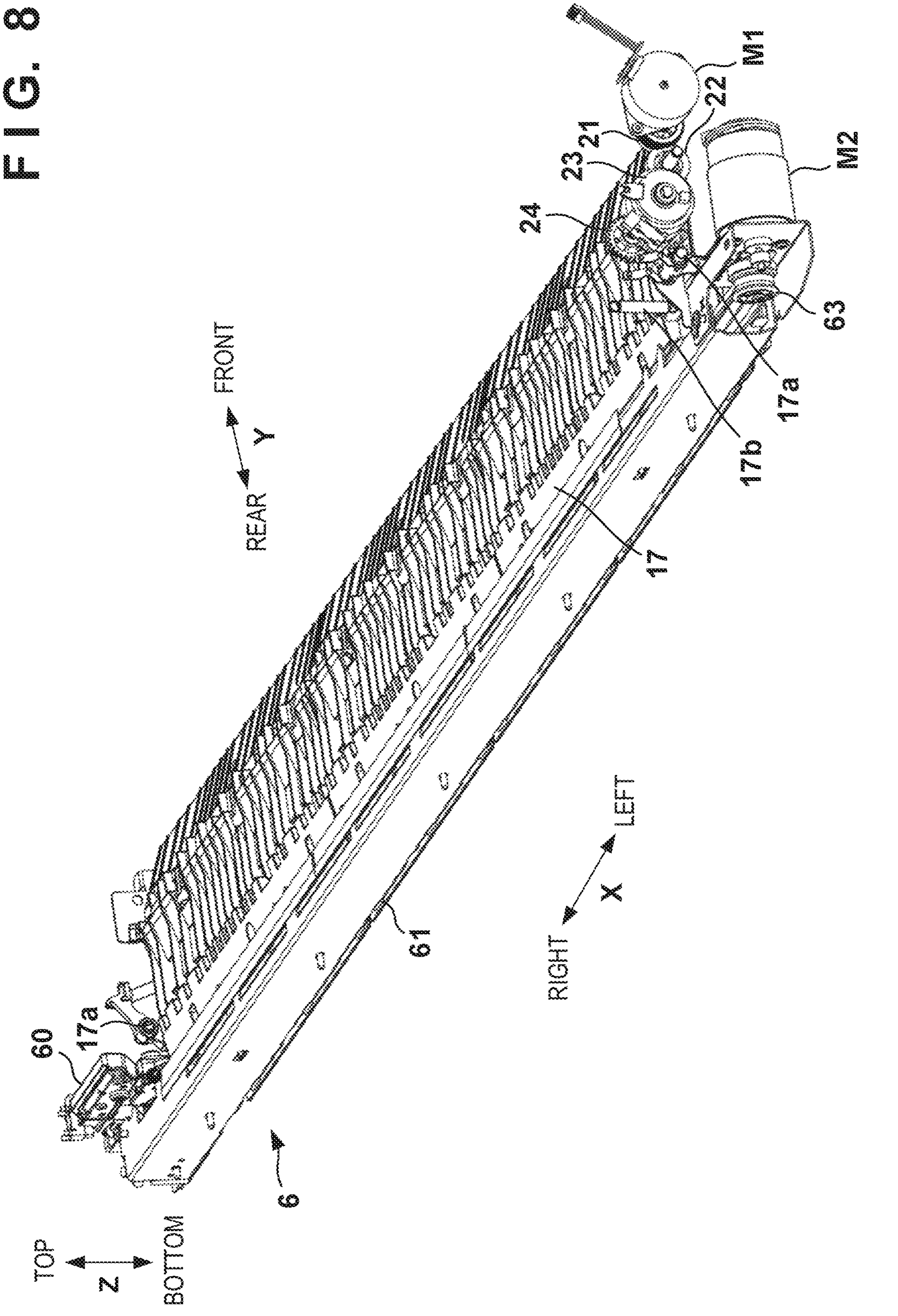
FIG. 8 is a perspective view showing the vicinity of a cutting unit.

First, the moving mechanism for the movable support member 17 will be described. FIG. 8 is a perspective view showing the cutting unit 6 and the portion of the moving mechanism for the movable support member 17 in the driving unit DIA The cutting unit 6 in this embodiment is a mechanism for cutting a sheet in the widthwise direction by moving, in the X direction, a scan unit 60 including a cutter blade. The scan unit 60 is movably supported by a guide member 61 extending in the X direction. The guide member 61 supports the motor M2 as a driving source, and a belt transmission mechanism 63 is provided inside the guide member 61. The belt transmission mechanism 63 includes a driving pulley and a driven pulley spaced apart from each other in the X direction, and an endless belt wound around the pulleys. The scan unit 60 is fixed to the endless belt. When the motor M2 causes the driving pulley to rotate, the endless belt travels and the scan unit 60 moves.

Figure 9A:
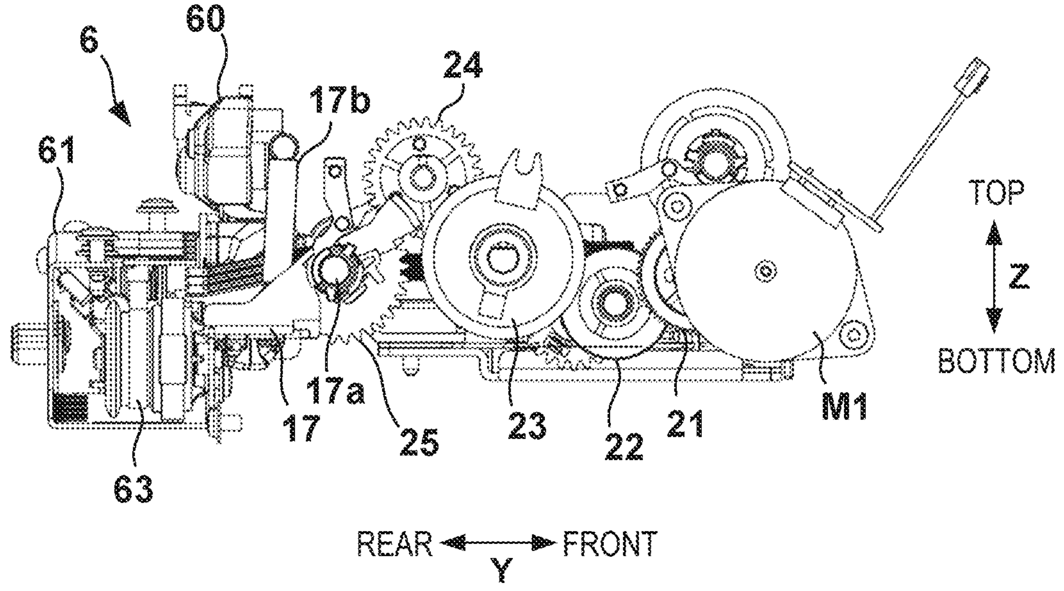
FIGS. 9A and 9B are views showing the movement mode of a movable support member.
Figure 9B:
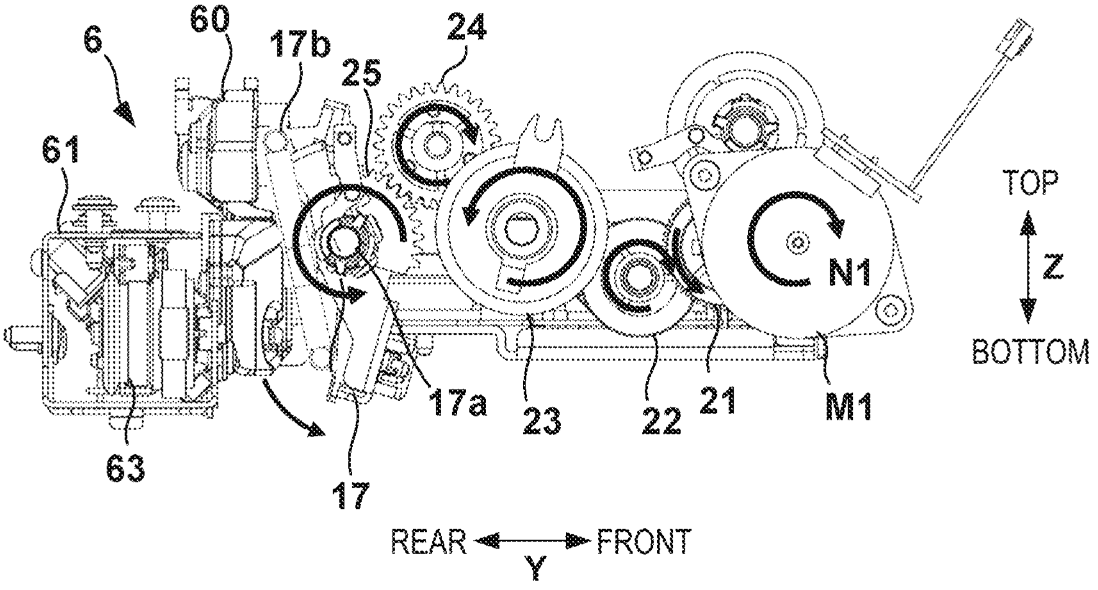

The movable support member 17 is arranged adjacent to the guide member 61 in the sheet conveyance direction. Upon moving the scan unit 60, the movable support member 17 is moved to avoid interference between the scan unit 60 and the movable support member 17. Refer to FIGS. 9A and 9B in addition to FIG. 7. FIGS. 9A and 9B are views for explaining the moving mechanism for the movable support member 17. FIG. 9A shows a state in which the movable support member 17 is located in the support position, and FIG. 9B shows a state in which the movable support member 17 is located in the retreat position. The movable support member 17 is provided so as to be pivotable with an X-direction shaft 17*a* as the pivot center, and a gear 25 is fixed to the shaft 17*a*. Further, the movable support member 17 is biased to the support position by an elastic member 17*b*. The elastic member 17*b* is a coil spring. One end of the elastic member 17*b* is fixed to the movable support member 17, and the other end thereof is fixed to the main body of the printing apparatus 1.

The transmission mechanism 20 includes a gear train formed by gears 21 to 24. The driving force of the motor M1 is transmitted to the gear 25 via the gear train, and the movable support member 17 is caused to pivot to the retreat position as shown in FIG. 9B. In the retreat position, the movable support member 17 retreats (moves diagonally downward) from the scan space of the scan unit 60. Each arrow in FIG. 9B indicates the rotation direction of each component.

Among the gears 21 to 24, the gear 23 is a gear provided with an electromagnetic clutch between an input gear and an output gear, and transmission of the driving force can be connected/disconnected by connecting/disconnecting the electromagnetic clutch. When the electromagnetic clutch is in a connection state, if the motor M1 is rotated in the N1 direction, the moving mechanism is operated and the movable support member 17 pivots from the support position to the retreat position. However, when the electromagnetic clutch is in a disconnection state, even if the motor M1 is rotated, the movable support member 17 does not pivot. After the movable support member 17 moves to the retreat position, by switching the electromagnetic clutch from the connection state to the disconnection state, the movable support member 17 returns to the support position due to the bias of the elastic member 17*b*.

<State Switching Mechanism>

Figure 10A:
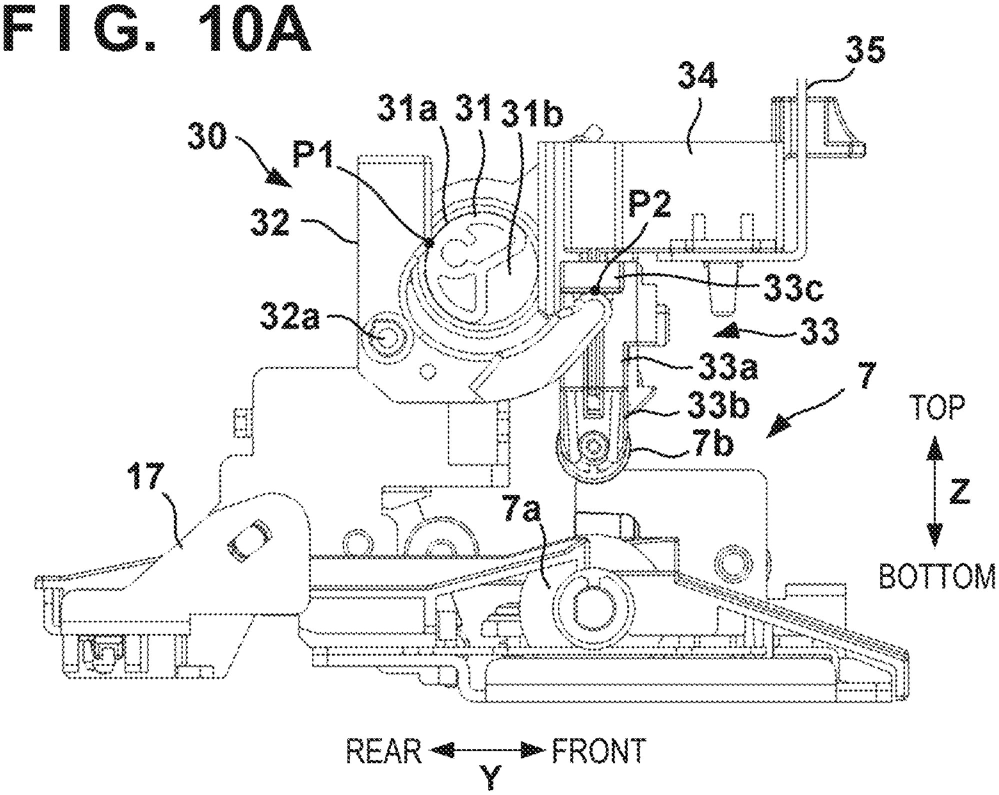
FIGS. 10A and 10B are views showing the state switching mode of a discharge roller 7.
Figure 10B:
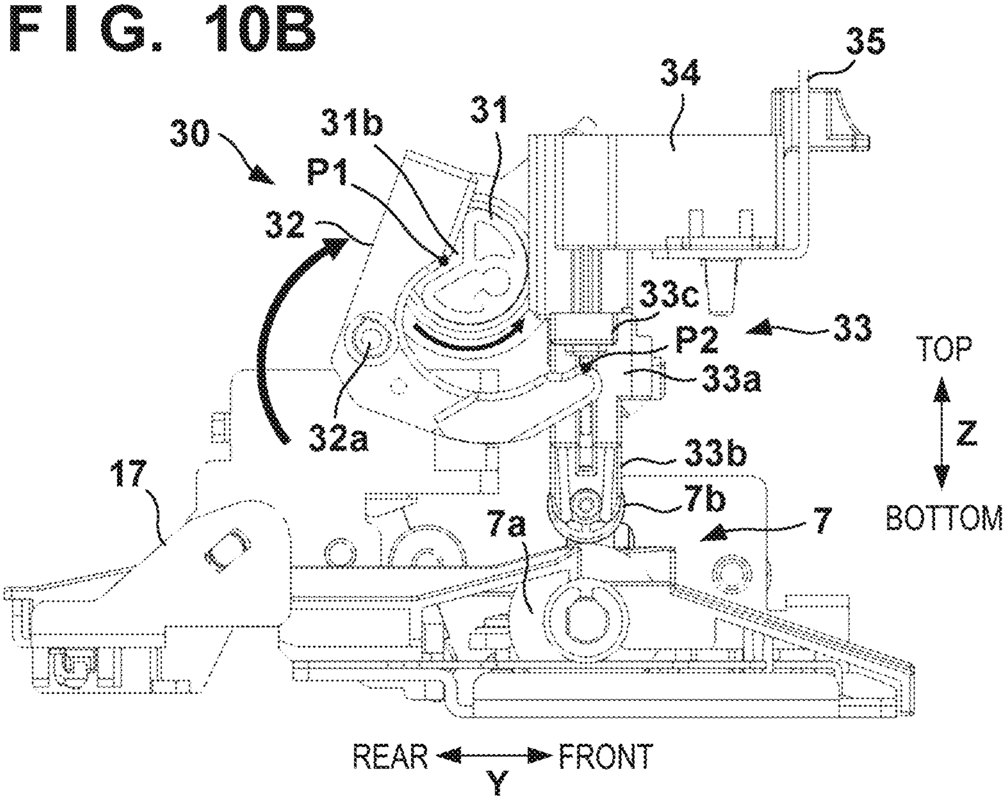
Figure 11:
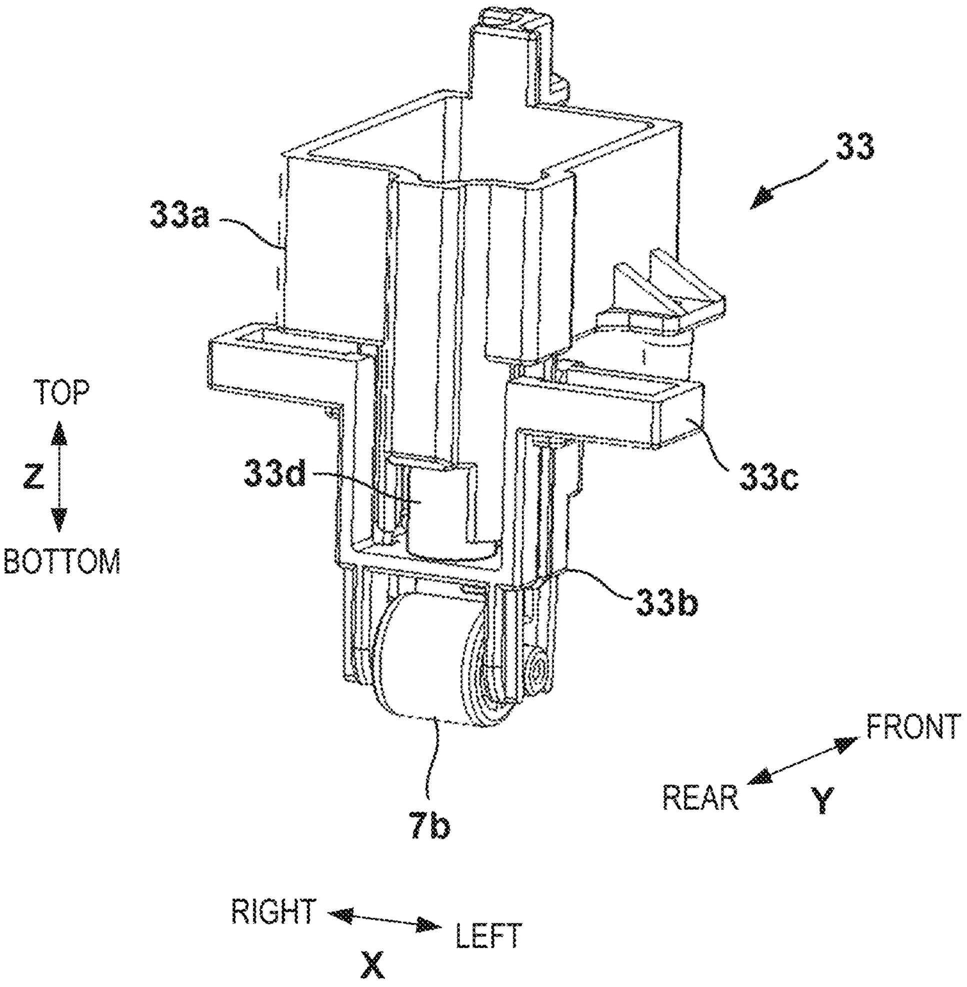
FIG. 11 is a perspective view of a support unit of a nip roller.

Next, the state switching mechanism for the discharge unit 7 will be described with reference to FIGS. 7, 10A, 10B, and 11. FIGS. 10A and 10B are views for explaining the operation. FIG. 10A shows a case in which the discharge unit 7 is in the nip released state (a case in which the nip roller 7*b* is located in an upper retreat position), and FIG. 10B shows a case in which the discharge unit 7 is in the nip state (a case in which the nip roller 7*b* is located in a lower nip position). FIG. 11 is a perspective view of a support structure of the nip roller 7*b*.

A plurality of the nip rollers 7*b* are arranged in the X direction, and each nip roller 7*b* is supported by a support unit 33. Each support unit 33 is supported by a frame 35 via a coupling member 34.

The support unit 33 includes a main body portion 33*a*, and a movable portion 33*b* supported so as to be displaceable in the Z direction with respect to the main body portion 33*a*. The nip roller 7*b* is rotatably supported by the movable portion 33*b*. The movable portion 33*b* includes a projection portion 33*c* projecting in the X direction, and an elastic member 33*d* which biases the movable portion 33*b* to the nip position is provided between the main body portion 33*a* and the movable portion 33*b*.

An operation shaft 31 extends in the X direction. The operation shaft 31 includes an arcuate peripheral surface 31*a*, and also includes a recess portion 31*b* in a part of the peripheral surface. An operation arm 32 is an L-shaped member provided for each nip roller 7*b*, and pivotable with a shaft 32*a* in its central portion as the pivot center. An abutting portion P1 of the operation arm 32 abuts against the peripheral surface 31*a* of the operation shaft 31, and an abutting portion P2 thereof abuts against the projection portion 33*c* of the movable portion 33*b* from below.

As shown in FIG. 10A, in the nip released state, the abutting portion P1 of the operation arm 32 abuts against the peripheral surface 31*a* of the operation shaft 31 so that the clockwise pivot of the operation arm 32 is restricted. Accordingly, the operation arm 32 restricts the downward movement of the movable portion 33*b* and the nip roller 7*b* is separated from the driving roller 7*a*. As shown in FIG. 10B, if the operation shaft 31 is rotated, the abutting portion P1 falls from the peripheral surface 31*a* into the recess portion 31*b*. This frees the clockwise pivot of the operation arm 32, and the restriction on the downward movement of the movable portion 33*b* by the operation arm 32 is released. The movable portion 33*b* is moved downward due to the bias of the elastic member 33*d*, and the discharge unit 7 is set in the nip state in which the nip roller 7*b* is pressed against the driving roller 7*a*.

Figure 12A:
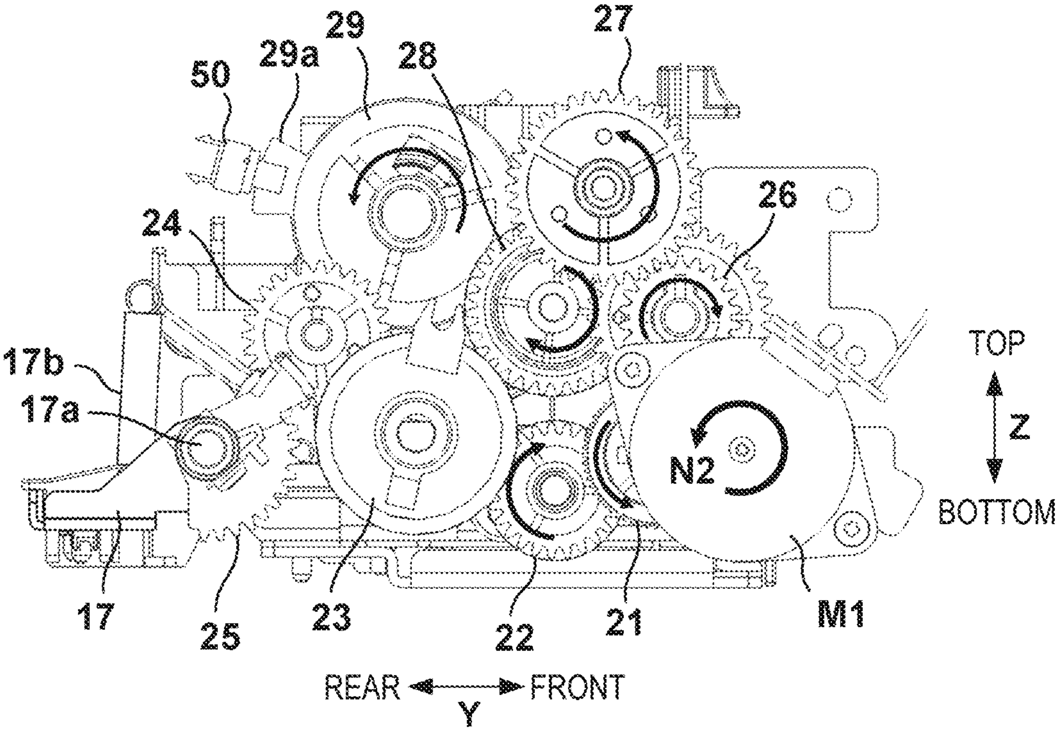
FIGS. 12A and 12B are views for explaining a driving transmission mechanism of the driving unit shown in FIG. 7.
Figure 12B:
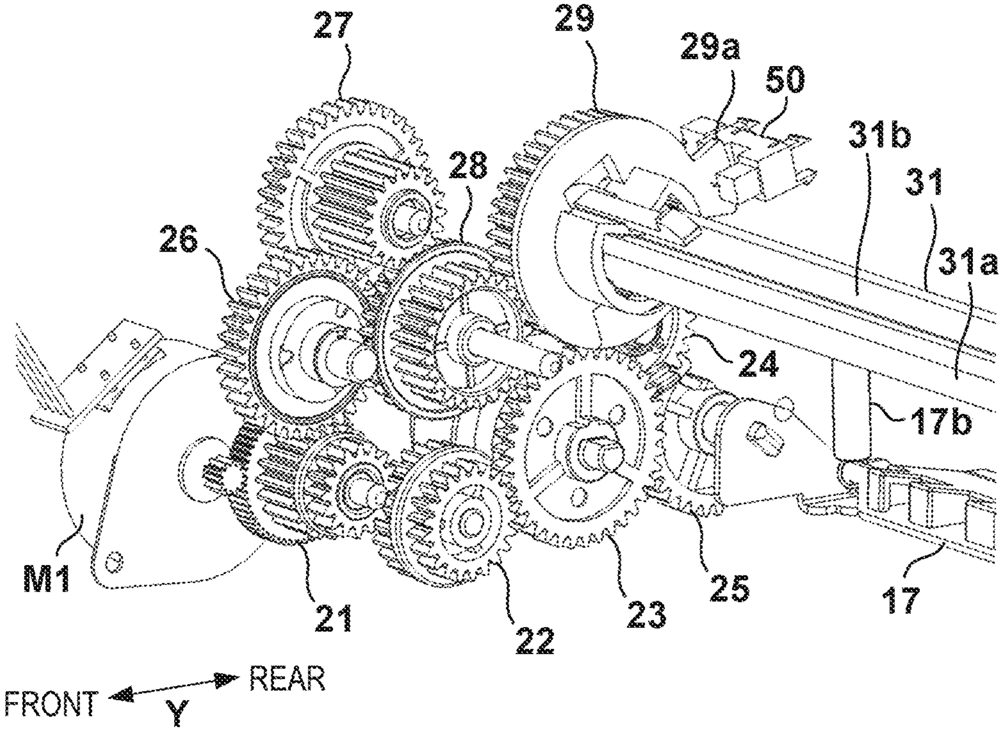

Referring to FIGS. 12A and 12B, a gear 29 is fixed to the end portion of the operation shaft 31. The transmission mechanism 20 includes a gear train formed by the gear 21 and gears 26 to 28. The driving force of the motor M1 is transmitted to the gear 29 via the gear train, and the operation shaft 31 is rotated. The gear 29 is provided with a detection piece 29*a*. By detecting the detection piece 29*a* by the sensor 50, the rotation position of the operation shaft 31 is specified and it is determined whether the discharge unit 7 is in the nip state or the nip released state. The sensor 50 is an optical sensor such as a photointerrupter.

Figure 13A:
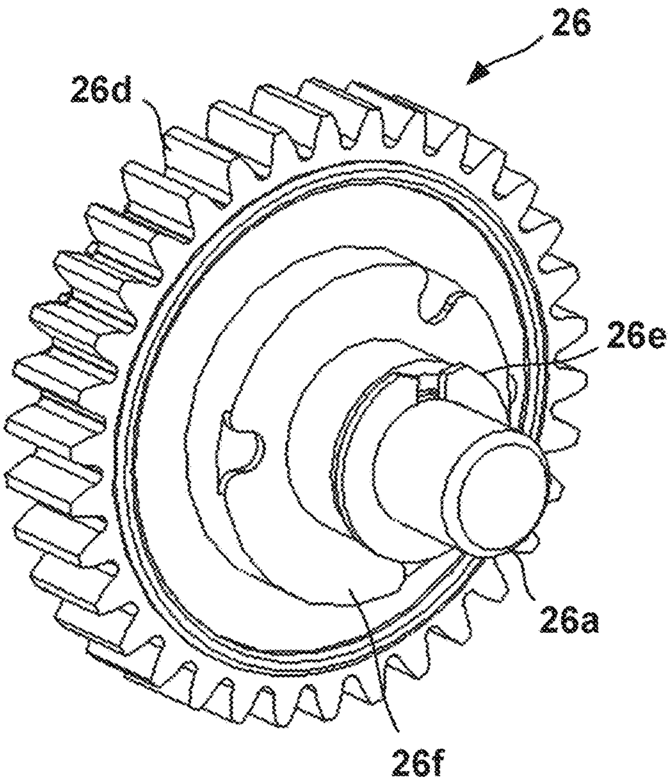
FIG. 13A is a perspective view of a gear.
Figure 13B:
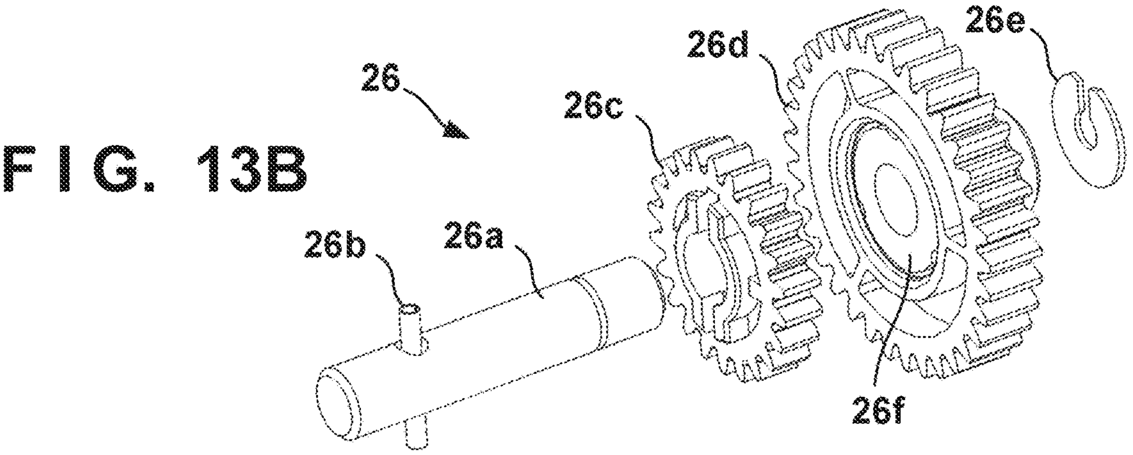
FIGS. 13B and 13C are exploded perspective views of the gear.
Figure 13C:
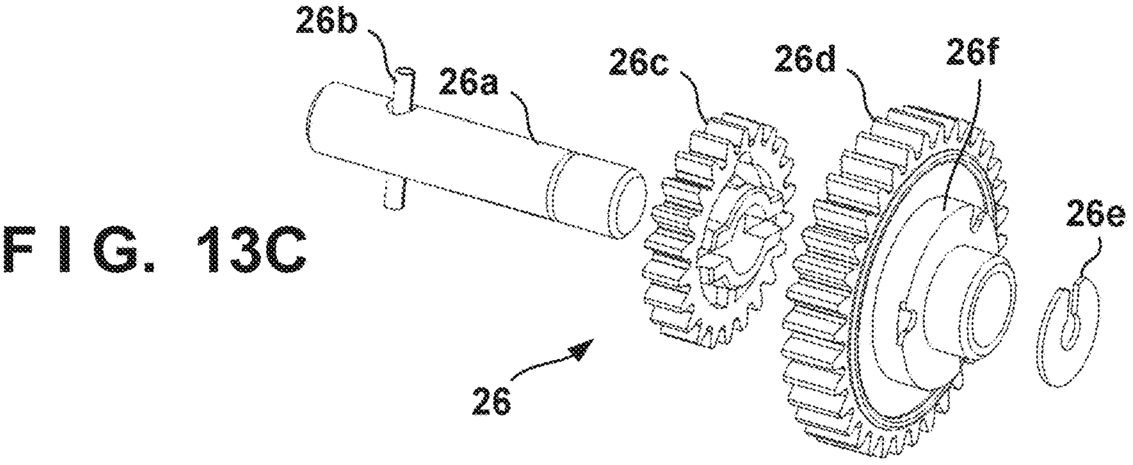

When operating the state switching mechanism, the motor M1 is rotated in the N2 direction opposite to the N1 direction which is a predetermined rotation direction for moving the movable support member 17. The gear 26 incorporates a one-way clutch, so that it transmits rotation of the motor M1 in the N2 direction but does not transmit rotation in the N1 direction. FIG. 13A is a perspective view of the gear 26, and FIGS. 13B and 13C are exploded perspective views of the gear 26.

The gear 26 has an arrangement in which a small-diameter gear 26*c* and a large-diameter gear 26*d* are arranged on a common shaft 26*a* and held on the shaft 26*a* by a retaining ring 26*e* in the end portion of the shaft 26*a*. The shaft 26*a* is provided with a pin 26*b*. Engagement between the small-diameter gear 26*c* and the pin 26*b* enables transmission of a rotational force between the shaft 26*a* and the small-diameter gear 26*c* regardless of the rotation direction. On the other hand, a one-way clutch 26*f* is provided between the large-diameter gear 26*d* and the shaft 26*a*, and the rotational force is transmitted between the shaft 26*a* and the large-diameter gear 26*d* only in one rotation direction.

With the arrangement described above, by using the rotation direction of the motor M1, the electromagnetic clutch of the gear 23, and the one-way clutch 26*f* of the gear 26, it is possible to move the movable support member 17 and vertically move the nip roller 7*b* independently. That is, when moving the movable support member 17 to the retreat position, the motor M1 is rotated in the N1 direction and the electromagnetic clutch of the gear 23 is set in the connection state. This allows the movable support member 17 to operate. At this time, due to the action of the one-way clutch 26*f*, the gear 26 does not transmit the rotational force. When moving the movable support member 17 to the support position, the electromagnetic clutch of the gear 23 is set in the disconnection state. When moving the nip roller 7*b* to the nip position or the retreat position, the motor M1 is rotated in the N2 direction and the electromagnetic clutch of the gear 23 is set in the disconnection state.

<Driving Unit DU2>

Figure 14:
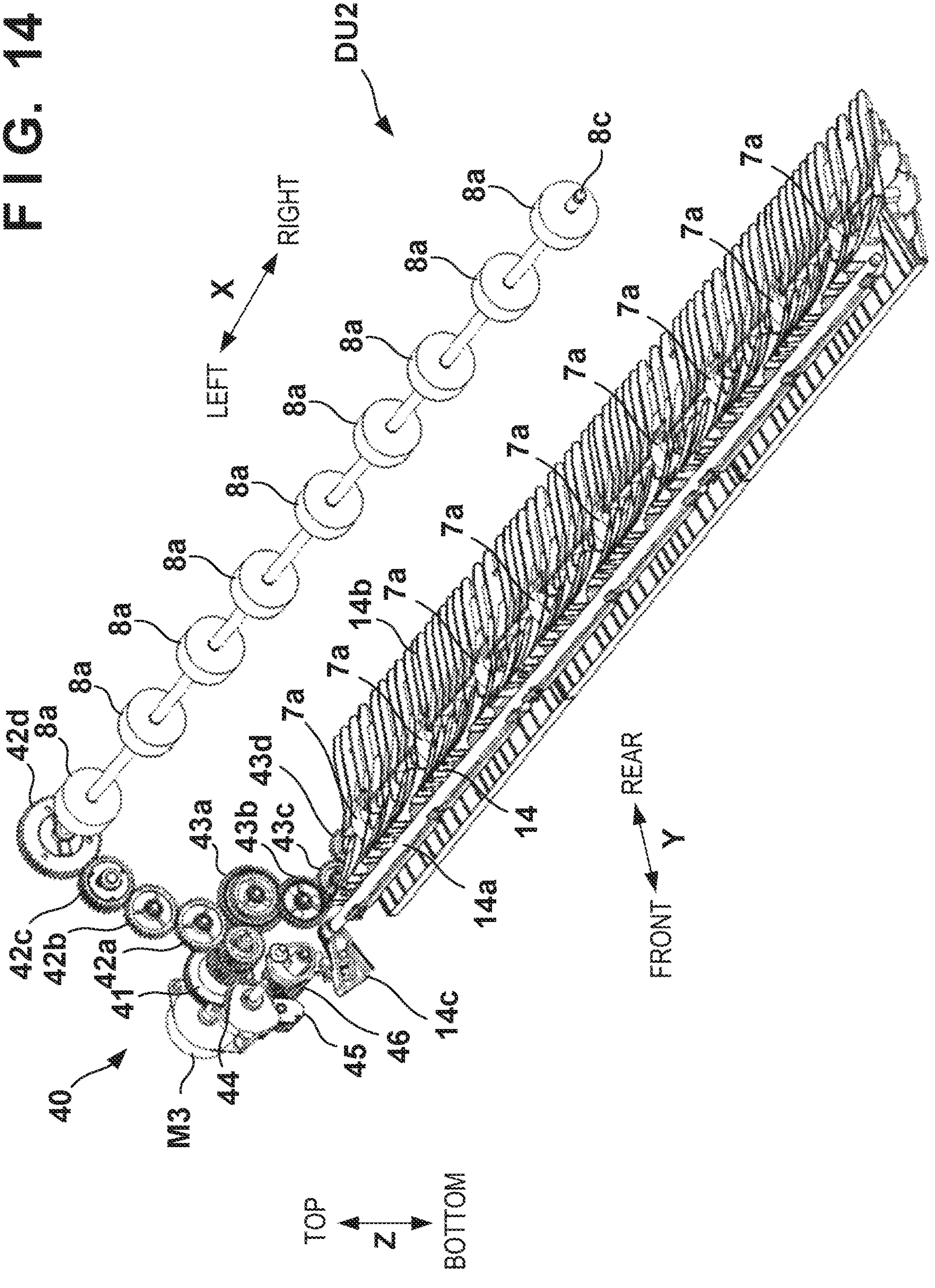
FIG. 14 is a schematic view of a driving unit different from the driving unit shown in FIG. 7.

FIG. 14 is a schematic view of the driving unit DU2. The driving unit DU2 forms a roller driving mechanism for driving the driving roller 7*a* of the discharge unit 7 and the driving roller 8*a* of the discharge unit 8. The driving unit DU2 also forms a path switching mechanism for selectively switching the discharge path to the discharge path RT1 or RT2 by switching the position of the path switching member 14. The driving unit DU2 includes the motor M3 as a common driving source. A driving force of the motor M3 is transmitted to each component by a transmission mechanism 40 which forms a transmission path of the driving force. The motor M3 and the transmission mechanism 40 are concentratedly arranged outside (left side) the conveyance path RT in the widthwise direction (X direction) of the sheet. That is, in this embodiment, the motor M1 and transmission mechanism 20 of the driving unit DU1 and the motor M3 and transmission mechanism 40 of the driving unit DU2 are concentratedly arranged on the left side of the conveyance path RT. With this arrangement, it is possible to suppress expansion of spaces for the mechanism systems on both sides of the conveyance path RT in the X direction. Thus, it is possible to store the mechanism systems in a compact driving space while achieving multifunctional driving.

<Roller Driving Mechanism>

Figure 15A:
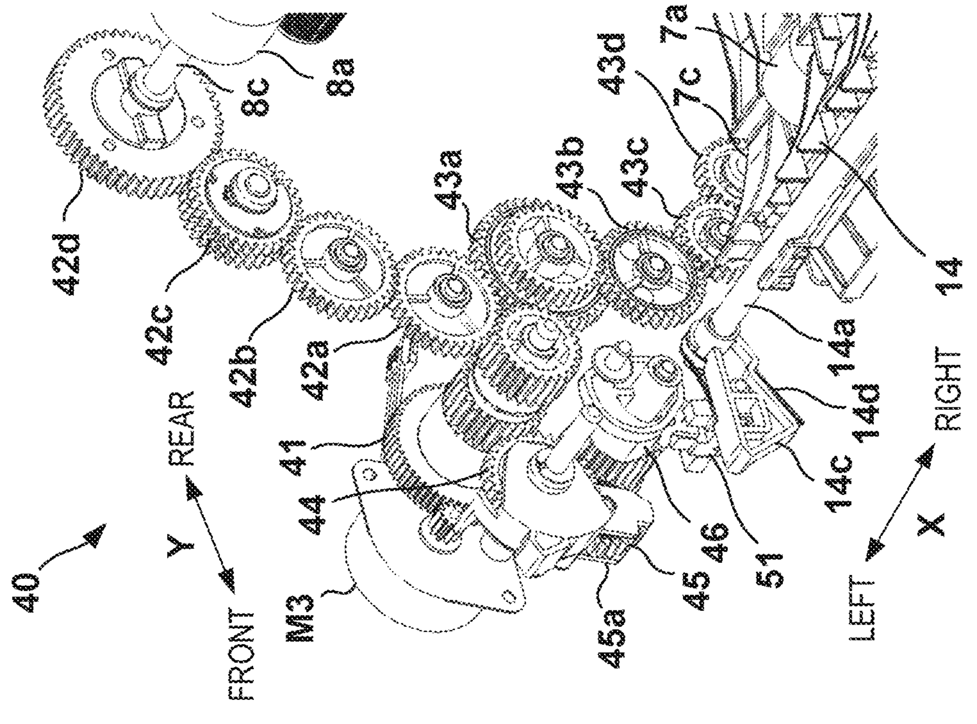
FIGS. 15A and 15B are views for explaining a driving transmission mechanism of the driving unit shown in FIG. 14.
Figure 15B:
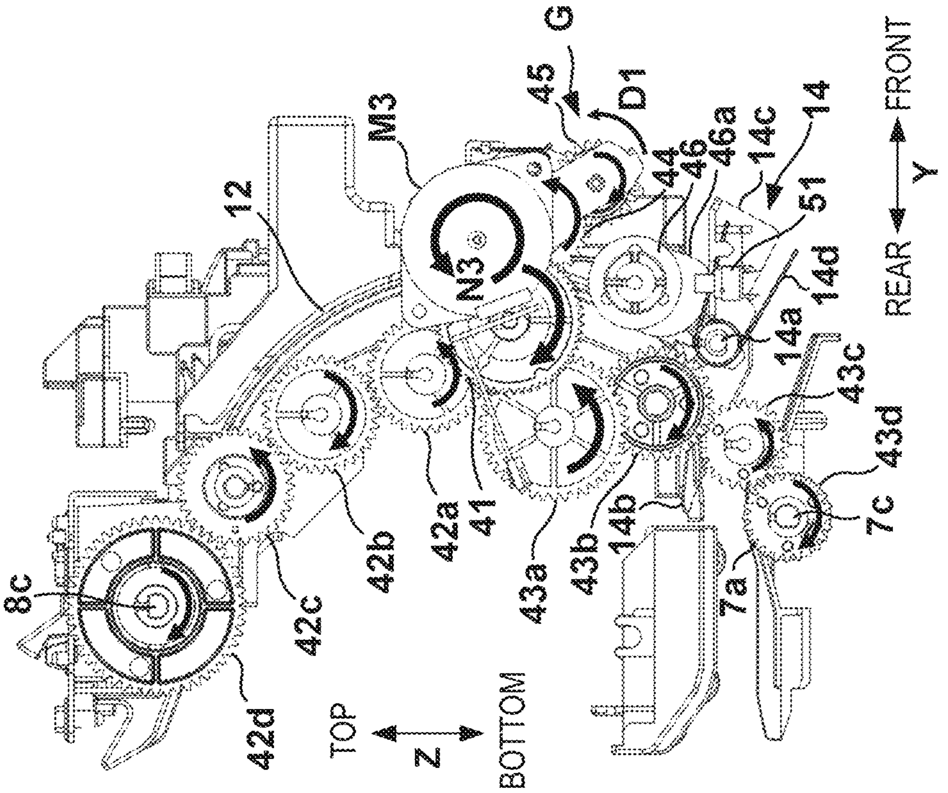

First, the roller driving mechanism will be described. FIG. 15A is a partially enlarged view of FIG. 14, and FIG. 15B is a view for explaining a mode of transmitting a driving force by the transmission mechanism 40. A plurality of the driving rollers 7*a* are arranged in the X direction so as to be spaced apart from each other, and fixed to a roller shaft 7*c* extending in the X direction. A gear 43*d* is fixed to one end portion of the roller shaft 7*c*. Similarly, a plurality of the driving rollers 8*a* are arranged in the X direction so as to be spaced apart from each other, and fixed to a roller shaft 8*c* extending in the X direction. A gear 42*d* is fixed to one end portion of the roller shaft 8*c*.

The transmission mechanism 40 includes a gear train formed by gears 41 and 42*a* to 42*c*. The driving force of the motor M3 is transmitted to the gear 42*d* via the gear train, and the roller shaft 8*c* is rotated. The transmission mechanism 40 also includes a gear train formed by the gear 41 and gears 43*a* to 43*c*. The driving force of the motor M3 is transmitted to the gear 43*d* via the gear train, and the roller shaft 7*c* is rotated. As shown in FIG. 15B, if the motor M3 is rotated in the N3 direction, each of the rollers 7*a* and 8*a* is rotated and the sheet is conveyed.

<Path Switching Mechanism>

Figure 16:
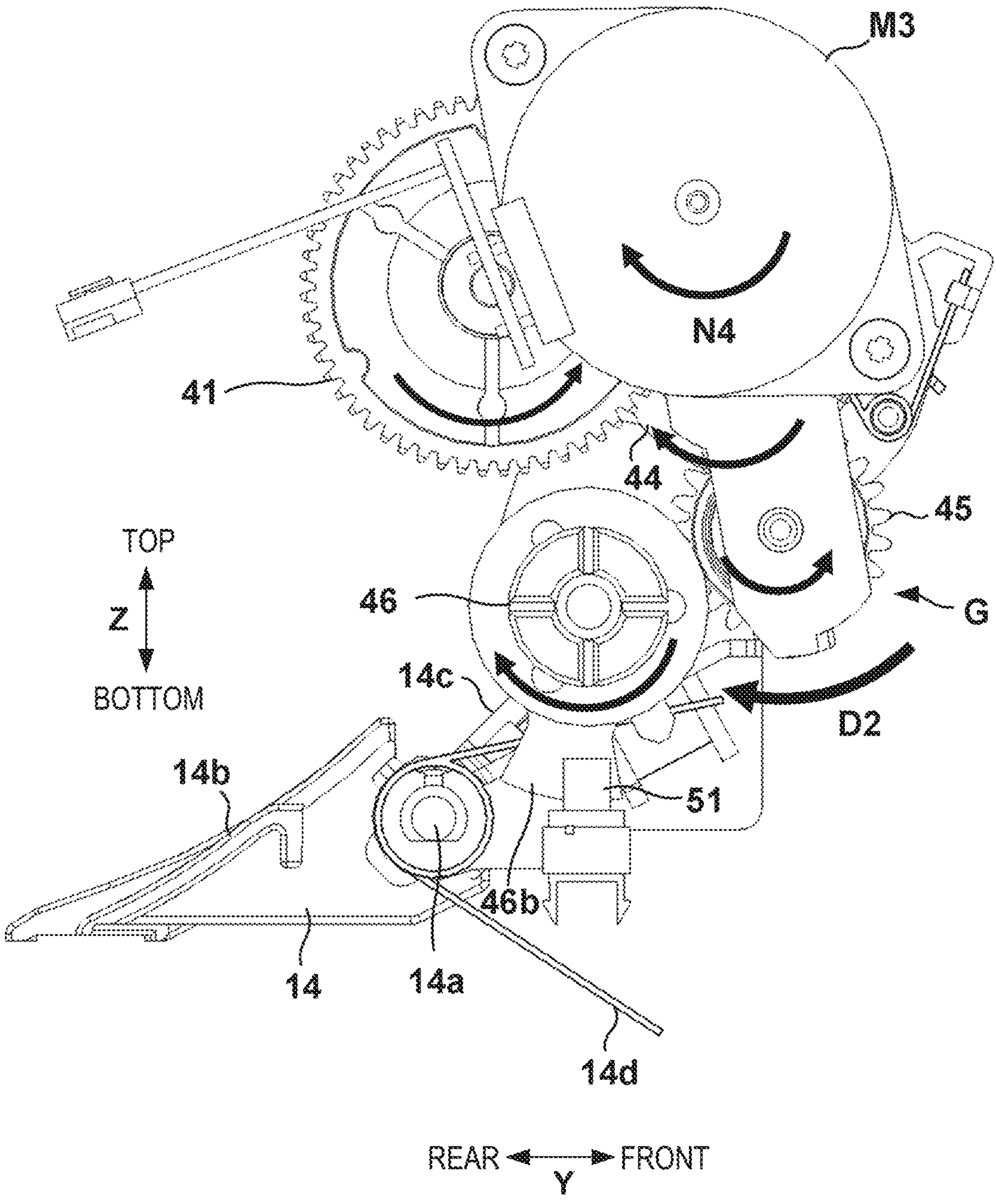
FIG. 16 is a view for explaining a path switching mechanism.
Figure 17A:
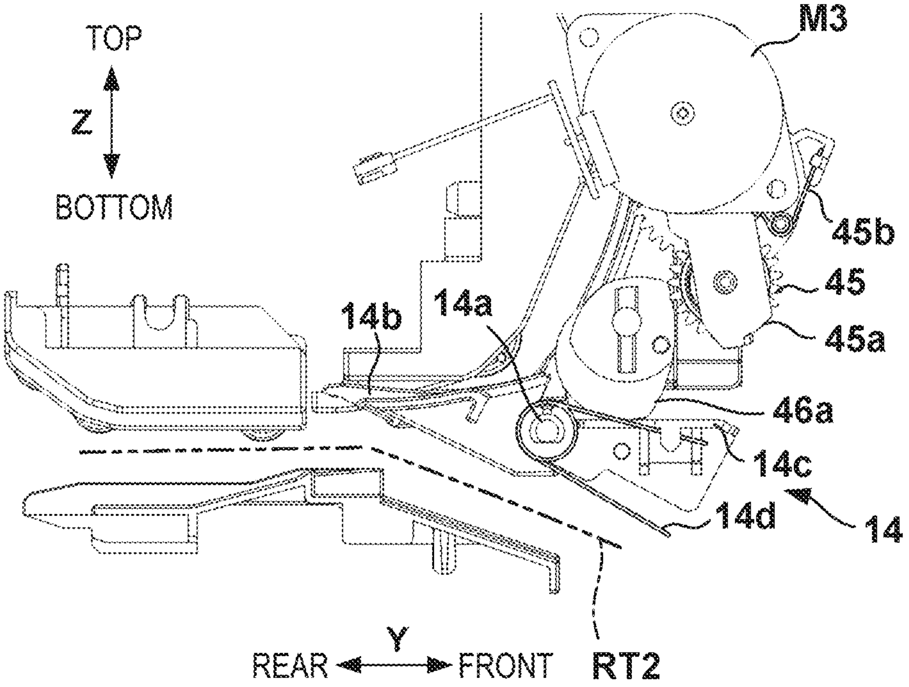
FIGS. 17A and 17B are views showing the switching mode of a path switching member.
Figure 17B:
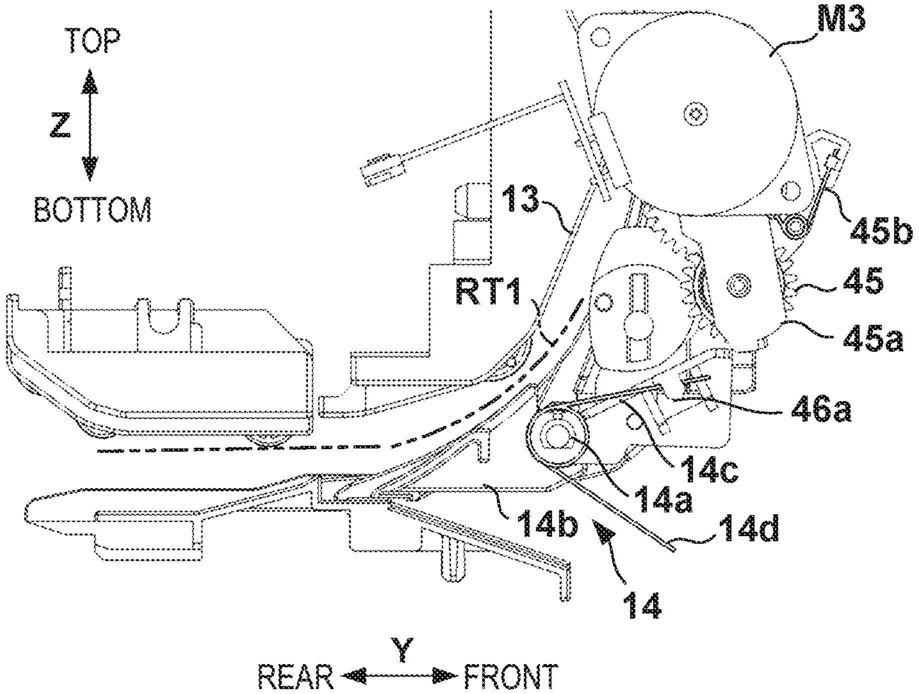

With reference to FIGS. 16, 17A, and 17B, the path switching mechanism will be described. FIG. 17A shows the position (to be referred to as the RT2 selection position) of the path switching member 14 for selecting the discharge path RT2, and FIG. 17B shows the position (to be referred to as the RT1 selection position) of the path switching member 14 for selecting the discharge path RT1. The path switching position (branch point BR) of the path switching member 14 is located on the conveyance path RT between the discharge unit 7 and the discharge unit 8.

The path switching member 14 includes the shaft 14*a* extending in the X direction. The shaft 14*a* is rotatably supported, and the path switching member 14 pivots with the shaft 14*a* as the pivot center. The path switching member 14 includes a guide portion 14*b* which forms a sheet guide surface, a lever portion 14*c*, and an elastic member 14*d*. The elastic member 14*d* in this embodiment is a screw spring, and biases the path switching member 14 to the RT1 selection position.

The transmission mechanism 40 includes a gear 46 including a cam portion 46*a*. The cam portion 46*a* abuts against the lever portion 14*c* of the path switching member 14, thereby causing the path switching member 14 to pivot from the RT1 selection position to the RT2 selection position. The pivot amount of the gear 46 is detected by the sensor 51. The sensor 51 is an optical sensor such as a photointerrupter which detects a detection piece 46*b* provided in the gear 46.

As a component for rotating the gear 46, the transmission mechanism 40 includes a pendulum gear G. The pendulum gear G includes a gear 44 and a gear 45 meshing with each other. The gear 44 meshes with the gear 41. If the gear 45 meshes with the gear 46 due to a swinging motion, the driving force is transmitted. If the gear 45 does not mesh with the gear 46, the transmission of the driving force is cut off. If the motor M3 is rotating in the N3 direction as shown in FIG. 15B, the pendulum gear G swings in the D1 direction, so the driving force is not transmitted to the gear 46. If the motor M3 is rotating in the N4 direction which is a predetermined rotation direction opposite to the N3 direction as shown in FIG. 16, the pendulum gear G swings in the D2 direction, so that the driving force is transmitted to the gear 46. This allows the path switching member 14 to operate. That is, the cam portion 46*a* abuts against the lever portion 14*c* of the path switching member 14, and this can cause the path switching member 14 to pivot to the RT2 selection position. If the gear 46 further rotates and the cam portion 46*a* passes through the lever portion 14*c*, the path switching member 14 returns to the RT1 selection position due to the bias of the elastic member 14*d*.

During sheet conveyance by the conveyance units 7 and 8, the motor M3 rotates in the N3 direction so the gear 45 does not mesh with the gear 46. Accordingly, the position of the path switching member 14 does not change. If the motor M3 is rotating in the N4 direction, the driving rollers 7*a* and 8*a* rotate in a direction opposite to the sheet conveyance direction. However, by switching the discharge path by the path switching member 14 at a timing other than during a printing operation, a sheet is not conveyed reversely. Alternatively, for example, a one-way clutch may be provided in any of the gears involved in the transmission of the driving force to each of the roller shafts 7*c* and 8*c* so that only the rotation in the sheet conveyance direction is transmitted to each of the roller shafts 7*c* and 8*c*. In this case, it is possible to switch the discharge path during a printing operation.

<Processing Example of Control Unit>

The printing apparatus 1 is provided with a plurality of conveyance mechanisms (discharge units 7 and 8) on the downstream side of the printhead 4. They generate a sheet conveyance force, but since they nip the printed sheet, the printed surface of the sheet may be scratched due to the pressing force of the conveyance mechanism, or the conveyance accuracy may be decreased due to a difference in conveyance speed between the conveyance mechanisms. In this embodiment, as has been described above, it is configured such that the state of the discharge unit 7 can be switched between the nip state and the nip released state. Therefore, in a case in which a sheet is sufficiently long so that the discharge unit 8 alone can generate a sufficient conveyance force or in a case of handling a sheet which is easily damaged, the discharge unit 7 can be set in the nip released state so as not to nip the sheet. On the other hand, in a case of a short sheet, the discharge unit 7 can be set in the nip state to ensure the conveyance force. Thus, it is possible to convey sheets of different sheet lengths and prevent generation of an unnecessary load on the sheet during the conveyance.

Figure 18:
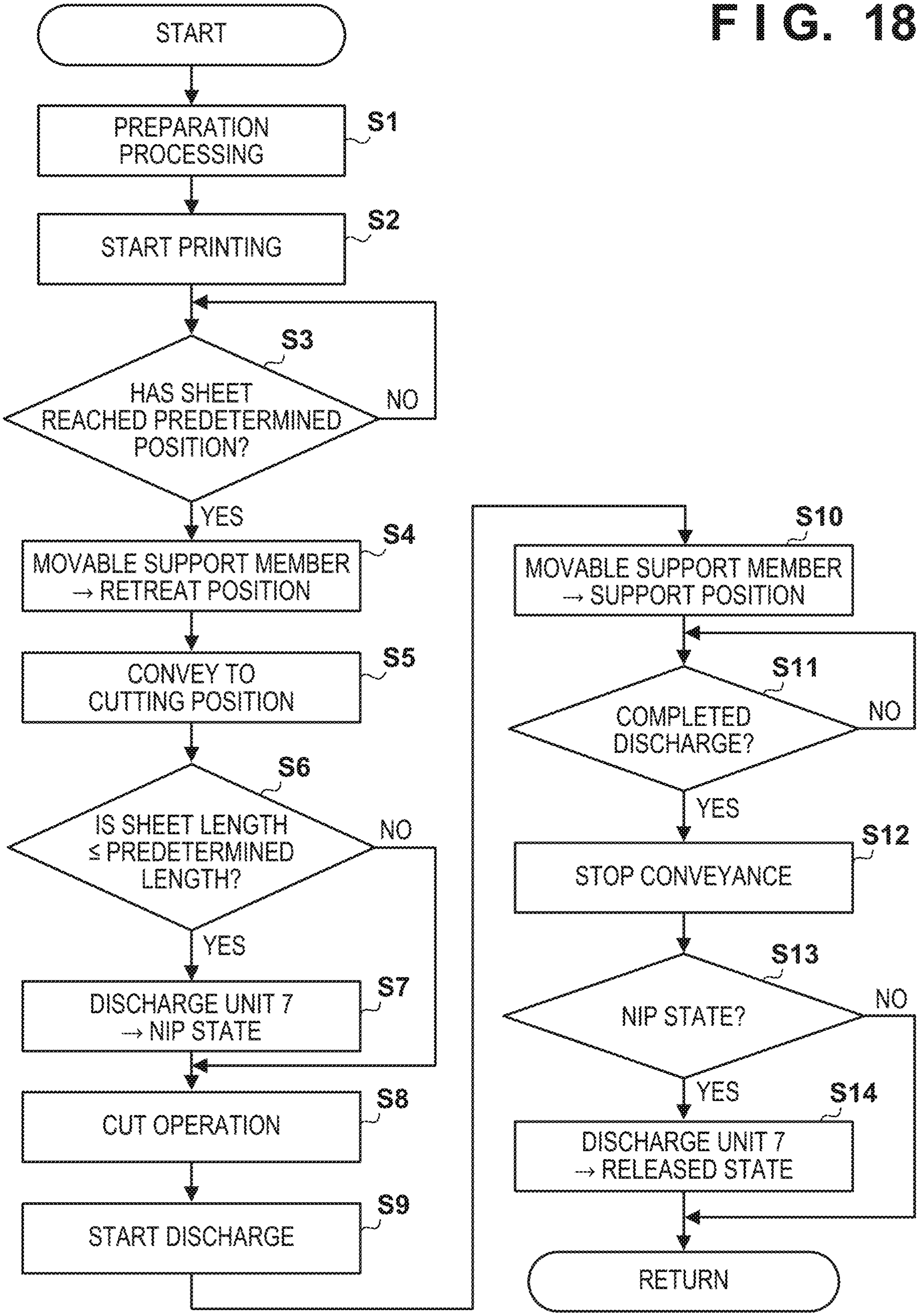
FIG. 18 is a flowchart illustrating a processing example of the control unit.

A processing example of the control unit 18 related to state switching of the discharge unit 7 and the like will be described below. FIG. 18 is a flowchart illustrating an example of processing performed by the processing unit 18*a*. In this embodiment, the processing is started with the discharge unit 7 set in the nip released state.

In step S1, preparation processing is performed. Here, the processing based on user's setting contents is performed. For example, switching of the discharge path by the path switching member 14 is performed. The processing example described below assumes a case in which the discharge path RT1 is selected. In step S2, a printing operation is started. By alternately repeating intermittent conveyance of a sheet by the conveyance unit 3 and an operation including moving the carriage 5 and ink discharge by the printhead 4, an image is printed on the sheet. Further, the respective driving rollers 7*a* and 8*a* of the discharge units 7 and 8 are rotated.

In step S3, based on a detection result of a sheet detection sensor (not shown), it is determined whether the sheet has reached a predetermined position. If the sheet has reached, the process advances to step S4. The predetermined position here is a position where the leading end of the sheet has passed through the movable support member 17 (for example, a position where the leading end of the sheet has reached the discharge unit 7). In step S4, the movable support member 17 is moved to the retreat position. Since the leading end of the sheet has already passed through the movable support member 17, even if the movable support member 17 is moved to the retreat position, the sheet is supported within the conveyance path RT. Thereafter, the printing operation is performed up to the image printing range set by the user in advance. In step S5, the sheet is conveyed to the position where it is to be cut by the cutting unit 6, and the conveyance is temporarily stopped. The conveyance amount at this time is determined based on, for example, the sheet length after cutting set by the user in advance.

Figure 19A:
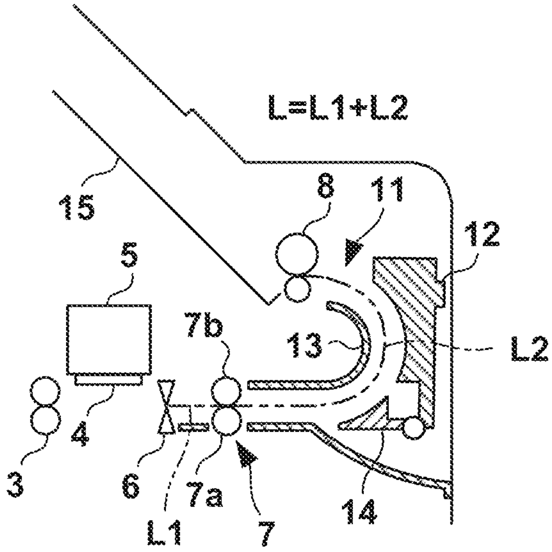
FIGS. 19A to 19C are views for explaining a sheet conveyance mode.

In step S6, it is determined whether the sheet length after cutting is equal to or smaller than a threshold (equal to or shorter than a predetermined length). FIG. 19A is a view for explaining a predetermined length L which serves as a criterion for the determination. In FIG. 19A, a length L1 indicates the path length of the conveyance path RT from the cutting unit 6 (more specifically, the cutting position) to the discharge unit 7 (more specifically, the nip position). A length L2 indicates the path length of the conveyance path RT (discharge path RT1) from the discharge unit 7 (more specifically, the nip position) to the discharge unit 8 (more specifically, the nip position). The predetermined length L is expressed by L=L1+L2, which is the path length from the cutting unit 6 to the discharge unit 8.

The predetermined length L is shorter than the minimum length of the sheet after cutting which is supposed to be conveyed. For example, due to the specifications of the printing apparatus 1, if the minimum length of the sheet after cutting is 203 mm, the predetermined length L is shorter than 203 mm. Similarly, the length L2 is shorter than the minimum length of the sheet after cutting which is supposed to be conveyed. Thus, the sheet of the minimum length can be nipped and conveyed by at least one of the conveyance units 7 and 8.

Figure 19B:
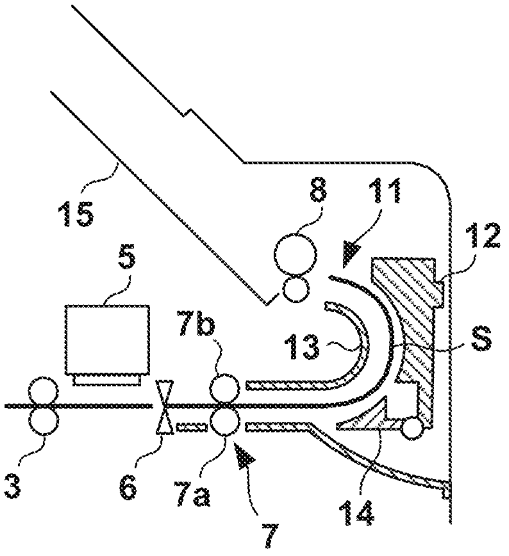
Figure 19C:
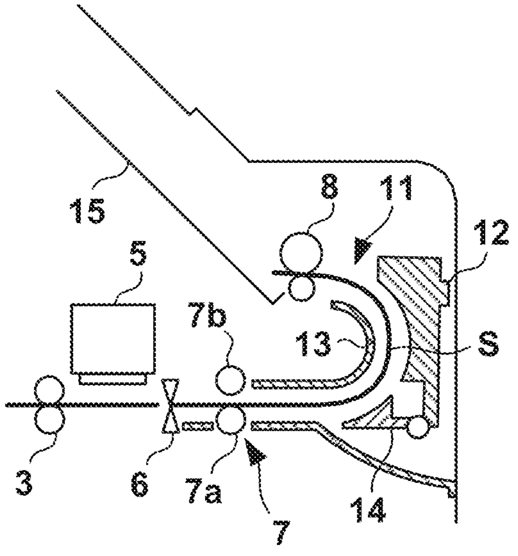

If the sheet length of the sheet after cutting is equal to or shorter than the predetermined length L, the leading end of the sheet has not reached the discharge unit 8. Then, the discharge unit 7 is set in the nip state in step S7 to use the discharge unit 7 to convey the sheet (FIG. 19B). The short sheet after cutting can be reliably discharged. If the sheet length of the sheet after cutting is longer than the predetermined length L, the leading end of the roll sheet R has reached the discharge unit 8. Then, the process does not advance to step S7 and the discharge unit 7 is maintained in the nip released state (FIG. 19C).

In step S8, the roll sheet R is cut by the cutting unit 6. In step S9, the respective driving rollers 7*a* and 8*a* of the discharge units 7 and 8 are rotated, and the sheet after cutting is conveyed to the stacking section 15. In this embodiment, due to the configuration of the apparatus, the driving roller 7*a* is rotated even if the discharge unit 7 is in the nip released state. However, since the nip roller 7*b* is not pressed against the driving roller 7*a*, substantially no conveyance force is generated.

In step S10, the movable support member 17 is returned to the support position. In step S11, based on a detection result of the sheet detection sensor, it is determined whether the sheet after cutting has been discharged to the stacking section 15. For example, if it is detected that the trailing end of the sheet has passed through the discharge unit 8, it is determined that the sheet has discharged to the stacking section 15. If it is determined that the sheet has been conveyed to the stacking section 15, the process advances to step S12 and the rotation of each of the driving rollers 7*a* and 8*a* of the discharge units 7 and 8 is stopped.

In step S13, it is determined whether the discharge unit 7 has been set in the nip state by the processing in step S7. If the discharge unit 7 has been set in the nip state, the process advances to step S14 and the discharge unit 7 is returned to the nip released state. With the processing described above, the process (one job) ends.

With the procedure described above, it is possible to discharge the sheet while selecting, in accordance with the sheet length after cutting, whether to press the nip roller 7*b* against the driving roller 7*a* or separate the nip roller 7*b* from the driving roller 7*a*. Thus, it is possible to appropriately convey the sheets of different sheet lengths. The processing example shown in FIG. 18 is merely an example. For example, it may be controlled such that as soon as the sheet is held by the discharge unit 8, the discharge unit 7 in the nip state is switched to the nip released state. Alternatively, if the discharge unit 7 is set in the nip state in step S7, a next job may be waited without returning the discharge unit 7 to the nip released state in step S14. In this case, the discharge unit 7 may be returned to the nip released state at the beginning of the next job, or the discharge unit 7 may be returned to the nip released state if it is determined that the sheet length is longer than the predetermined length L in step S6 for the next job. Note that when discharging the sheet from the discharge path RT2, the discharge unit 7 is set in the nip released state. However, as needed, the discharge unit 7 may be set in the nip state.

Other Embodiments

In the embodiment described above, the arrangement has been exemplarily shown in which two discharge paths (RT1 and RT2) are provided. However, the number of the discharge paths may be three or more, or may be one. Further, although the reversing section 11 is provided in the discharge path RT1, the arrangement may be employed in which no reversing section 11 is provided.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-197310, filed Nov. 27, 2020, which is hereby incorporated by reference herein in its entirety.

What is claimed is:

1. A printing apparatus comprising:
- a printing unit, including a discharge port through which ink is discharged, and configured to perform printing on a sheet;
- a first conveyance unit, including a rotating body, and configured to convey the sheet to the printing unit while nipping the sheet;
- a second conveyance unit, including a rotating body, provided on a downstream side of the first conveyance unit in a conveyance direction of the sheet, and configured to convey the sheet while nipping the sheet;
- a third conveyance unit, including a rotating body, provided on a downstream side of the second conveyance unit in the conveyance direction and configured to convey the sheet while nipping the sheet;
- a cutting unit, including a cutter blade, arranged at a position between the printing unit and the second conveyance unit in a conveyance path of the sheet and configured to cut the sheet; and
- a switching unit, including an operation member, and configured to switch between a nip state of the second conveyance unit and a released state in which the nip state is released by moving the operation member,
- wherein before the cutting unit cuts the sheet, the switching unit selectively switches between the nip state and the released state in accordance with a length of the sheet from a cutting position on the sheet where the cutting unit is to cut the sheet to a leading end of the sheet.

2. The apparatus according to claim 1, wherein
- a path length of the conveyance path from the second conveyance unit to the third conveyance unit is shorter than a minimum length of the sheet to be conveyed.

3. The apparatus according to claim 1, wherein the sheet is a roll sheet as the sheet, and the sheet pulled out from the roll sheet is conveyed by the first conveyance unit, the second conveyance unit, and the third conveyance unit, and is cut by the cutting unit.

4. The apparatus according to claim 3, wherein
- a path length of the conveyance path from the cutting unit to the third conveyance unit is shorter than a minimum length of the sheet to be conveyed.

5. The apparatus according to claim 1, wherein
- the switching unit is configured to:
  - set the nip state when the length of the sheet is not longer than a threshold; and
  - set the released state when the length of the sheet is longer than the threshold.

6. The apparatus according to claim 1, wherein
- the third conveyance unit is arranged at a position higher than the second conveyance unit, and
- the conveyance path from the second conveyance unit to the third conveyance unit includes a curved portion.

7. The apparatus according to claim 1, further comprising:
- a plurality of sheet discharge paths included in the conveyance path; and
- a path switching unit, including a path switching member, and configured to switch to, among the plurality of discharge paths, the discharge path to be used to discharge the sheet having undergone printing by the printing unit by moving the path switching member,
- wherein a path switching position of the path switching unit is set between the second conveyance unit and the third conveyance unit.

8. The apparatus according to claim 1, further comprising:
- a plurality of sheet discharge paths included in the conveyance path; and
- a path switching member configured to switch to, among the plurality of discharge paths, the discharge path to be used to discharge the sheet having undergone printing by the printing unit,
- wherein the third conveyance unit and the path switching member are driven by a driving force of a common motor.

9. The apparatus according to claim 8, further comprising a transmission mechanism configured to form transmission paths of a driving force of the motor for the third conveyance unit and the path switching member, wherein the transmission mechanism is configured to transmit the driving force of the motor to the path switching member when a rotation direction of the motor is a predetermined rotation direction.

10. The apparatus according to claim 9, wherein each of the second conveyance unit and the third conveyance unit includes a first rotating body and a second rotating body pressed against each other, and the transmission mechanism transmits the driving force of the motor to the first rotating body of each of the second conveyance unit and the third conveyance unit.

11. The apparatus according to claim 9, wherein the transmission mechanism is arranged outside the conveyance path of the sheet in a widthwise direction of the sheet.

12. A printing apparatus comprising:

a printing unit, including a discharge port through which in is discharged, and configured to perform printing on a sheet;

a first conveyance unit, including a rotating body, and configured to convey the sheet to the printing unit while nipping the sheet;

a second conveyance unit, including a rotating body, provided on a downstream side of the first conveyance unit in a conveyance direction of the sheet, and configured to convey the sheet while nipping the sheet;

a third conveyance unit, including a rotating body, provided on a downstream side of the second conveyance unit in the conveyance direction, and configured to convey the sheet while nipping the sheet;

a switching unit, including an operation member, and configured to switch between a nip state of the second conveyance unit and a released state in which the nip state is released by moving the operation member;

a support member arranged between the printing unit and the second conveyance unit, and configured to support the sheet at a support position; and a moving unit, including an actuator as a driving source, and configured to move the support member between the support position and a retreat position retreated from the support position, wherein when the sheet is conveyed by the third conveyance unit, the switching unit selectively switches between the nip state and the released state in accordance with a length of the sheet.

13. The apparatus according to claim 12, wherein the driving source is a motor common to the switching unit and the moving unit.

14. The apparatus according to claim 13, wherein the switching unit and the moving unit include a transmission mechanism configured to form transmission paths of a driving force of the motor.

15. The apparatus according to claim 14, wherein the transmission mechanism allows the switching unit to operate when a rotation direction of the motor is a predetermined rotation direction.

16. The apparatus according to claim 15, wherein the transmission mechanism includes a one-way clutch arranged in the transmission path, and the one-way clutch allows the switching unit to operate when the rotation direction of the motor is the predetermined rotation direction.

17. The apparatus according to claim 14, wherein the transmission mechanism includes a clutch configured to connect/disconnect transmission of the driving force from the motor, and the moving unit is operated when the clutch is in a connection state.

18. The apparatus according to claim 17, wherein the clutch is an electromagnetic clutch.

19. The apparatus according to claim 14, wherein the transmission mechanism is arranged outside the conveyance path of the sheet in a widthwise direction of the sheet.

20. The apparatus according to claim 12, wherein the sheet is a roll sheet.

21. The apparatus according to claim 20, further comprising a cutting unit arranged at a position between the printing unit and the second conveyance unit in a conveyance path of the sheet, the cutting unit including a cutter blade and being configured to cut the sheet pulled out from the roll sheet.

* * * * *